(12) United States Patent
McAlpine et al.

(10) Patent No.: US 11,794,413 B2
(45) Date of Patent: Oct. 24, 2023

(54) ADDITIVE MANUFACTURING ON UNCONSTRAINED FREEFORM SURFACES

(71) Applicant: Regents of the University of Minnesota, Minneapolis, MN (US)

(72) Inventors: Michael C. McAlpine, Minneapolis, MN (US); Zhijie Zhu, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 472 days.

(21) Appl. No.: 16/460,194

(22) Filed: Jul. 2, 2019

(65) Prior Publication Data

US 2020/0001540 A1      Jan. 2, 2020

Related U.S. Application Data

(60) Provisional application No. 62/693,146, filed on Jul. 2, 2018.

(51) Int. Cl.
   *B29C 64/393* (2017.01)
   *B29C 64/112* (2017.01)
   (Continued)

(52) U.S. Cl.
   CPC .......... *B29C 64/393* (2017.08); *B29C 64/112* (2017.08); *B33Y 10/00* (2014.12);
   (Continued)

(58) Field of Classification Search
   CPC ..... B29C 64/112; B29C 64/393; B33Y 10/00; B33Y 30/00; B33Y 50/02; B33Y 70/00;
   (Continued)

(56) References Cited

U.S. PATENT DOCUMENTS 9,776,364 B2   10/2017   Wang
9,841,750 B2   12/2017   Willis et al.
(Continued)

FOREIGN PATENT DOCUMENTS

CN   108312547 A *   7/2018
WO   2018014440 A1   1/2018

OTHER PUBLICATIONS

Zhu, Z., Guo, S.-Z., Hirdler, T., Eide, C., Fan, X., Tolar, J., McAlpine, M. C., 3D Printed Functional and Biological Materials on Moving Freeform Surfaces, Adv. Mater., Apr. 25, 2018, 30, 1707495. https://doi.org/10.1002/adma.201707495 (Year: 2018).*

(Continued)

*Primary Examiner* — Matthew J Daniels
*Assistant Examiner* — Andrew L Swanson
(74) *Attorney, Agent, or Firm* — Shumaker & Sieffert, P.A.

(57) ABSTRACT

Systems and techniques are described for additive manufacturing, e.g., 3D printing, a component on an unconstrained freeform build surface. The systems and techniques may allow determining a 3D trajectory and/or deformation of a target deposition region on the build surface by determining a relative location of at least one registration feature on the build surface. Control circuitry may control, based on the 3D trajectory and/or deformation and based on a build model of the component, at least one dispenser to cause dispensing of at least one composition from the at least one dispenser in a predetermined pattern on or adjacent to the target deposition region. The predetermined pattern of the composition defines at least one portion of the component.

21 Claims, 26 Drawing Sheets

(51) Int. Cl.
    *B33Y 10/00*     (2015.01)
    *B33Y 50/02*     (2015.01)
    *B33Y 30/00*     (2015.01)
    *B33Y 70/10*     (2020.01)
    *B29K 105/00*    (2006.01)
    *B29K 71/00*     (2006.01)
(52) U.S. Cl.
    CPC .............. *B33Y 30/00* (2014.12); *B33Y 50/02* (2014.12); *B33Y 70/10* (2020.01); *B29K 2071/02* (2013.01); *B29K 2105/0094* (2013.01)
(58) Field of Classification Search
    CPC .......... B29K 2105/0094; A61M 37/00; A61M 37/0076–0084
    USPC ......................................... 606/116, 285, 186
    See application file for complete search history.

(56) References Cited

U.S. PATENT DOCUMENTS

| | | | |
|---|---|---|---|
| 10,299,871 B2* | 5/2019 | Zingaretti | A61B 5/448 |
| 10,621,812 B1* | 4/2020 | McNenny | A61K 8/0245 |
| 2008/0247637 A1* | 10/2008 | Gildenberg | A61B 34/70 901/41 |
| 2013/0189435 A1 | 7/2013 | Mackie et al. | |
| 2015/0042755 A1* | 2/2015 | Wang | B29C 64/393 348/46 |
| 2015/0239178 A1* | 8/2015 | Armstrong | G06F 30/18 700/98 |
| 2016/0075089 A1* | 3/2016 | Duro Royo | B29C 64/106 264/308 |
| 2016/0167309 A1 | 6/2016 | Liu et al. | |
| 2016/0198576 A1 | 7/2016 | Lewis et al. | |
| 2016/0324586 A1* | 11/2016 | Zingaretti | A61B 17/3468 |
| 2017/0050382 A1 | 2/2017 | Minardi et al. | |
| 2019/0036337 A1* | 1/2019 | Zhang | B29C 64/379 |
| 2021/0129443 A1* | 5/2021 | Plott | B29C 64/245 |

OTHER PUBLICATIONS

JenTheRipper, Robot Tattoo Machine Is Back! Now Tattooing Real People!, Apr. 30, 2018 (Accessed May 23, 2023), Tattoodo, https://www.tattoodo.com/articles/robot-tattoo-machine-is-back-now-tattooing-real-people-5639 (Year: 2018).*
Singh et al., "3D printed conformal microfluidics for isolation and profiling of biomarkers from whole organs," Royal Society of Chemistry, Lab Chip, vol. 17, Jun. 12, 2017, 12 pp.
Guo et al., "3D Printed Stretchable Tactile Sensors," Advanced Materials, vol. 29, Jul. 2017, 27 pp.
Schaffner et al., "3D printing of bacteria onto functional complex materials," Science Advances, vol. 3, Dec. 1, 2017, 10 pp.
"Gravity-neutral 3D printing," Mataerial, Institute for advanced architecture of Catalonia, retrieved from http://www.mataerial.com/, accessed on Mar. 20, 2020, 8 pp.
Chen et al., "Stem Cells for Skin Tissue Engineering and Wound Healing," Critical Reviews in Biomedical Engineering, vol. 37, Nov. 24, 2011, 16 pp.
O'Neill et al., "3D Bioprinting Directly Onto Moving Human Anatomy," IEEE/RSJ International Conference on Intelligent Robots and Systems (IROS), Sep. 24-28, 2017, 7 pp.
Li et al., "In situ repair of bone and cartilage defects using 3D scanning and 3D printing," Scientific Reports, vol. 7, Aug. 25, 2017, 12 pp.
Bausch et al., "InSPIREd—Advances in Conformal Printing: 3D Printing onto Unknown Uneven Surfaces," IEEE International Conference on Advanced Intelligent Mechatronics (AIM), Jul. 3-7, 2017, 6 pp.
Sitthi-Amorn et al., "MultiFab: A Machine Vision Assisted Platform for Multi-material 3D Printing," Association for Computing Machinery (ACM), Aug. 2015, 11 pp.
Nuchitprasitchai et al., "Three Hundred and Sixty Degree Real-Time Monitoring of 3-D Printing Using Computer Analysis of Two Camera Views," MDPI, Journal of Manufacturing and Material Processing, Jul. 4, 2017, 32 pp.
Zhu et al., "3D Printed Functional and Biological Materials on Moving Freeform Surfaces," Advanced Materials, vol. 30, No. 23, Jun. 6, 2018, 9 pp.
"Skin Grafts—Skin Grafting," Encyclopedia.com, accessed from https://www.encyclopedia.com/medicine/drugs/pharmacology/skin-grafts#3406200415, updated Feb. 26, 2020, accessed on Mar. 20, 2020, 3 pp.
"Donation and Transplantation Statistics—National Donate Life Month—Apr. 2017," Donate Life America, Organ Procurement and Transplantation Network (OPTN), Dec. 9, 2016, 1 pp.
"Aerosol Jet 5X System For 3D Printed Electronic Applications," OPTOMEC.com, accessed from https://optomec.com/wp-content/uploads/2018/08/AJ_5X-System_WEB0818.pdf, Jul. 2018, 2 pp.
"Arevo Labs Introduces First-of-its-Kind Robotic Additive Manufacturing Platform for 3D Printing Composite Parks," Arevo Labs, Nov. 16, 2015, accessed from https://arevo.com/news_item/arevo-labs-introduces-first-of-its-kind-robotic-additive-manufacturing-platform-for-3d-printing-composite-parts-2/, accessed on May 20, 2020, 4 pp.
"Stratasys ready to ship the H2000 3D printer previously introduced at IMTS as the Infinite Build 3D demonstrator," 3D Printing Industry, Aug. 3, 2017, accessed from https://3dprintingindustry.com/news/stratasys-announces-sales-forecasts-infinite-build-h2000-provisions-mass-3d-printed-production-119694/, accessed on May 20, 2020, 5 pp.
"A radically new 3D printing method," Mataerial, accessed from http://www.mataerial.com/, accessed on May 20, 2020, 6 pp.
Valentine et al., "Hybrid 3D Printing of Soft Electronics," Advanced Materials, Advanced Science News, DOI: 10.1002/adma.201703817, Sep. 6, 2017, 8 pp.
Zhao et al. "An integrated CNC accumulation system for automatic building-around-inserts," Journal of Manufacturing Processes, vol. 15, Elsevier, Science Direct, Jul. 11, 2013, 12 pp.

* cited by examiner

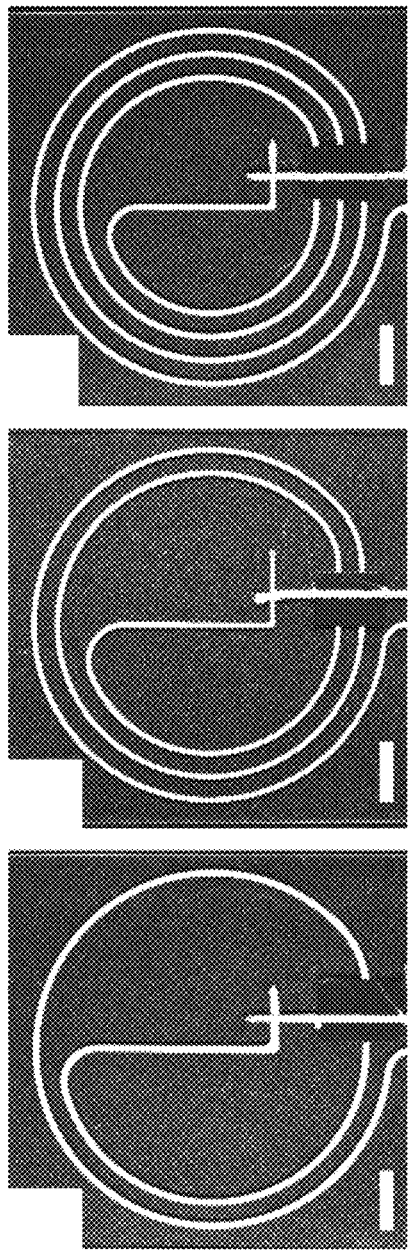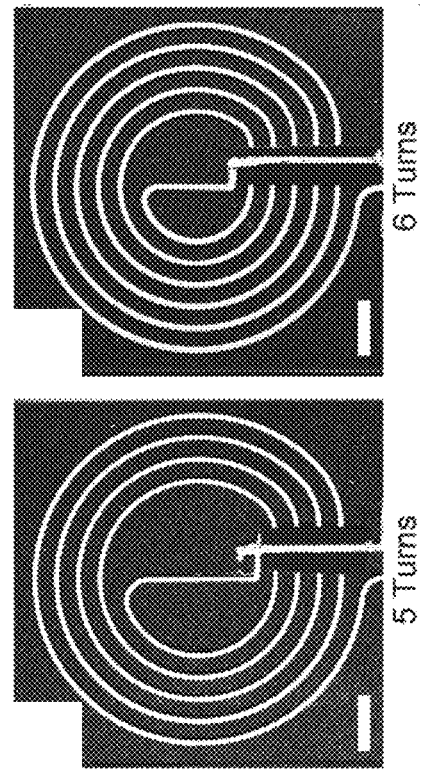

ary dispenser to dispense at least one composition from the
ADDITIVE MANUFACTURING ON UNCONSTRAINED FREEFORM SURFACES This application claims the benefit of U.S. Provisional Patent Application No. 62/693,146, titled, "ADDITIVE MANUFACTURING ON UNCONSTRAINED FREEFORM SURFACES," filed Jul. 2, 2018, the entire content of which is incorporated herein by reference.

GOVERNMENT RIGHTS

This invention was made with government support under EB020537 awarded by the National Institutes of Health. The government has certain rights in the invention.

TECHNICAL FIELD

This disclosure relates to systems and techniques for additive manufacturing on unconstrained freeform surfaces.

BACKGROUND

Additive manufacturing, also known as three-dimensional printing, or 3D printing, may be used to rapidly fabricate components based on digital models. Conventional 3D printing technologies typically rely on open-loop, calibrate-then-print operation procedures. Conventional 3D printing devices deposit layers of material on flat and stationary surfaces or build platforms.

SUMMARY

The disclosure describes systems and techniques for additive manufacturing on unconstrained freeform surfaces. The system and techniques may provide certain technical advantages such as allowing additive manufacturing or closed-loop real-time or near real-time control of deposition of compositions or materials in order to fabricate components, devices, or structures, or repair defects, on an unconstrained (for example, static, moving, vibrating, rotating, and/or deforming) freeform (for example, contoured) build surface. A controller may be configured to track a trajectory and/or deformation of the unconstrained freeform build surface by sensing at least one registration feature on the build surface. The registration feature may include a 2D geometric feature of the build surface, a 3D geometric feature of the build surface, a temporary marker affixed to the build surface, a texture pattern of the build surface, a heat map feature associated with the build surface, or the like. The controller may sense the at least one registration feature using, for example, one or more image sensors, one or more time-of-flight sensors, one or more radars, one or more LIDARs (light detection and ranging devices), and/or one or more thermal sensors. In some examples, the controller may register the registration features with 3D point cloud information to enable tracking of the motion and/or deformation of the build surface and/or prediction of future motion and/or deformation of the build surface. The controller may control a dispenser to dispense one or more compositions on or adjacent to the target deposition region on the build surface based on the 3D point cloud information.

In some examples, the disclosure describes a system for additively manufacturing a component on an unconstrained freeform build surface. The system includes at least one dispenser directable towards the unconstrained freeform build surface; at least one sensor configured to sense at least one registration feature on the unconstrained freeform build surface; at least one material repository configured to hold at least one composition, wherein the at least one material repository is fluidically connected to the at least one dispenser; and a controller. The controller includes a data storage module configured to store a build model of the component and control circuitry. The control circuitry is configured to: generate, based on sensor data received from the at least one sensor, a point cloud model of the unconstrained freeform build surface, determine, based on the sensor data, a relative location of the at least one registration feature on the unconstrained freeform build surface over time, determine, based at least on the relative location of the at least one registration feature and the point cloud model, a three-dimensional (3D) trajectory and/or deformation of a target deposition region on the unconstrained freeform build surface, and control, based on the 3D trajectory and/or deformation and the build model, the dispenser to cause dispensing of the at least one composition from the dispenser in a predetermined pattern on or adjacent to the target deposition region, wherein the predetermined pattern of the composition defines at least one portion of the component.

In some examples, the disclosure describes a technique for additively manufacturing a component on an unconstrained freeform build surface. The technique includes generating, by control circuitry, based on sensor data received from at least one sensor, a point cloud model of the unconstrained freeform build surface; determining, by the control circuitry, based on the sensor data, a relative location of at least one registration feature on the unconstrained freeform build surface over time; determining, by the control circuitry, based at least on the relative location of the at least one registration feature and the point cloud model, a three-dimensional (3D) trajectory and/or deformation of a target deposition region on the unconstrained freeform build surface; and controlling, by the control circuitry, based on the 3D trajectory and/or deformation and a build model of the component stored in a data storage module, at least one dispenser to dispense at least one composition from the dispenser in a predetermined pattern on or adjacent to the target deposition region, wherein the predetermined pattern of the composition defines at least one portion of the component.

In some examples, the disclosure describes a non-transitory computer readable storage medium. The non-transitory computer readable storage medium includes instructions that, when executed by at least one processor, cause the at least one processor to generate, based on sensor data received from at least one sensor, a point cloud model of the unconstrained freeform build surface; determine, based on the sensor data, a relative location of at least one registration feature on the unconstrained freeform build surface over time; determine, based at least on the relative location of the at least one registration feature and the point cloud model, a three-dimensional (3D) trajectory and/or deformation of a target deposition region on the unconstrained freeform build surface; and control, based on the 3D trajectory and/or deformation and a build model of the component stored in a data storage module, at least one dispenser to dispense at least one composition from the dispenser in a predetermined pattern on or adjacent to the target deposition region, wherein the predetermined pattern of the composition defines at least one portion of the component.

The details of one or more examples are set forth in the accompanying drawings and the description below. Other

BRIEF DESCRIPTION OF DRAWINGS

FIG. 18A is a photograph illustrating an example additively manufactured inductive coil including two turns.

FIG. 18B is a photograph illustrating an example additively manufactured inductive coil including three turns.

FIG. 18C is a photograph illustrating an example additively manufactured inductive coil including four turns.

FIG. 18D is a photograph illustrating an example additively manufactured inductive coil including five turns.

FIG. 18E is a photograph illustrating an example additively manufactured inductive coil including six turns.

DETAILED DESCRIPTION

Figure 1:
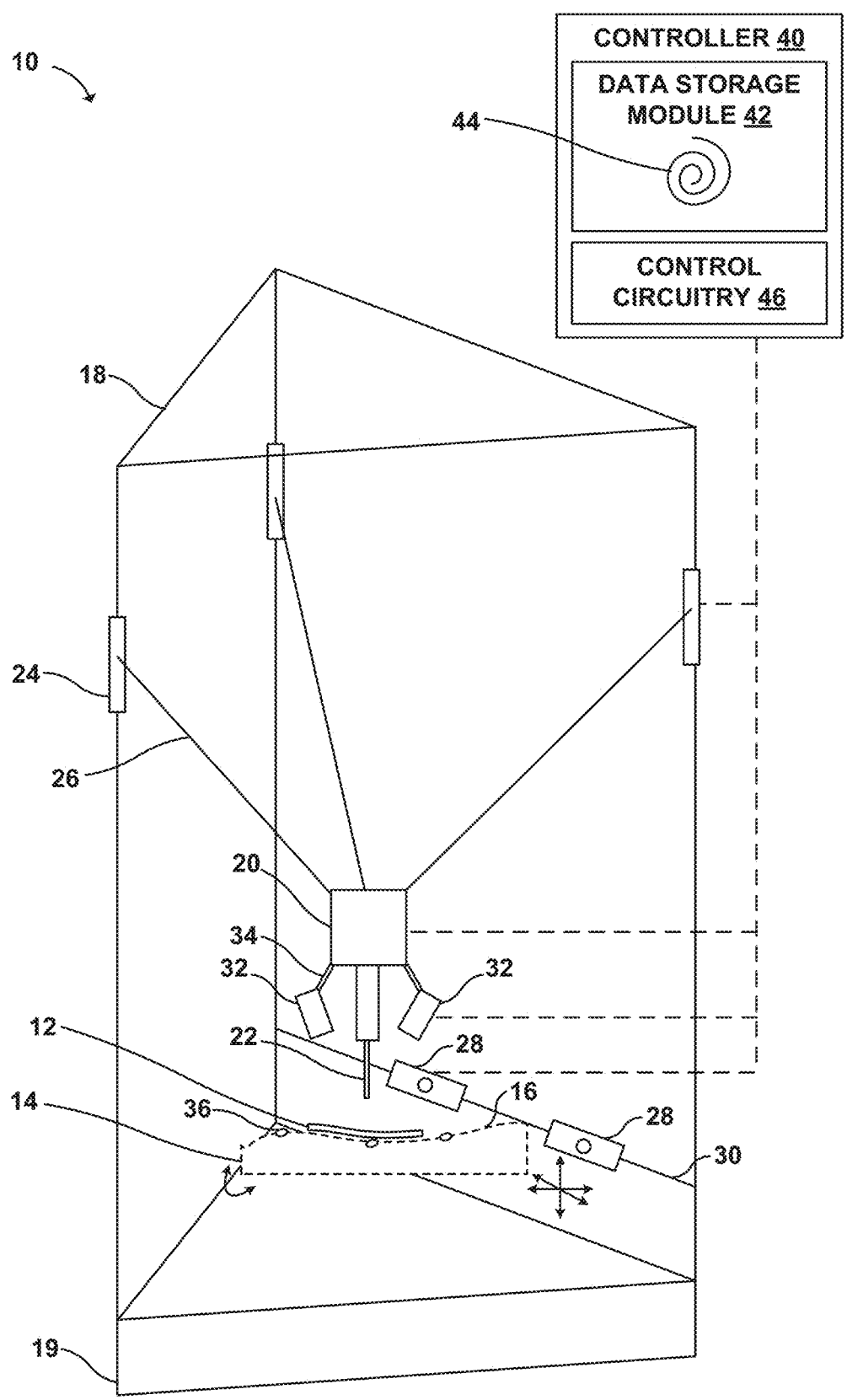
FIG. 1 is a conceptual drawing of an example system for additively manufacturing a component on a unconstrained freeform build surface.

The disclosure describes example systems, techniques, and compositions for additive manufacturing on unconstrained freeform build surfaces.

The creation of seamless interfaces between biological systems and multifunctional devices may facilitate the fabrication of next-generation wearable devices for applications in teleoperation, medical treatments, health monitoring, and even personal entertainment. Conventional wearable devices are either substantially rigid (e.g., smart fitness watches), or soft but with determinant shapes (e.g., haptic gloves for virtual reality applications). Such properties may be incompatible with target biological surfaces that possess highly arbitrary, dynamically varying geometries, such as skin and tissues. As a result, non-seamless interfaces between wearable devices and target surfaces can be created, compromising user comfort and device performance, such as inaccurate capture of physical status and incomplete exchange of cells at the interface. One approach toward fixing this problem is to fabricate a flat device with thin, deformable materials using microfabrication, and subsequently transfer them to the target surface for a conformal interface. However, microfabrication may be complex, and may use dedicated and specialized facilities and operating environments. Moreover, previous approaches have relied on open-loop calibrate-then-print procedures by utilizing cumbersome reverse-engineering techniques. However, these approaches are only applicable to static target surfaces. For example, previous systems and techniques may not allow accurate printing on surfaces that are unconstrained (free to move with one or more degrees of freedom) or freeform (e.g., contoured or curved).

Systems and techniques according to this disclosure allow automated or semi-automated fabrication of additively manufactured devices in freeform geometries that are actively adaptive to target surfaces in real time or near-real time, without the need for microfabrication facilities. Closed-loop feedback and control may enable adaptive 3D printing on unconstrained freeform build surfaces by accounting for a trajectory, deformation, or both of a moving build surface. In some examples, systems and techniques according to this disclosure may compensate for the full six degrees of freedom of rigid body motions, may compensate for deformation of surfaces in one or more dimensions, may be applicable to target surfaces having arbitrary (for example, contoured) surfaces, may be compatible with a continuous, extrusion-based printing method in order to achieve a relatively faster speed of fabricating 3D structures, may make use of a diverse palette of materials, or combinations thereof. Thus, adaptive 3D printing as described herein may allow the fabrication of multifunctional devices on unconstrained freeform surfaces that may or may not be deformable. In some examples, systems and techniques according to the disclosure may facilitate the autonomous fabrication of on-body devices, require minimal human intervention, be ambient-processable without the requirement of being tethered to a microfabrication facility, or combinations thereof.

The geometric information of the target surface may be acquired in the form of a point cloud via a sensor. The sensor may include any sensor configured to sense position, orientation, and/or deformation of the target surface using any suitable technique, including optical techniques, thermal techniques, electrical techniques, biological techniques, or the like. For example, the sensor may include a depth sensor or 3D scanner configured to sense 3D information based on a triangulation-based method, a time-of-flight method, or an optical coherence tomography method. For example, the sensor may include a structured light scanner. The sampled geometric information may be combined with a real-time estimation of the motion and/or deformation of the target surface and fed back to a motion controller for adaptive 3D printing.

In some examples, during printing, a discrete electronic component, such as a surface-mounted light-emitting diode (LED), may be optionally pick-and-placed onto the target surface manually or automatically. Non-functional or functional inks or printable compositions, such as conductive and insulator inks or other any suitable printable composition, may be directly printed onto the unconstrained target surface to create devices such as electronic circuits. In some examples, after printing, the printed devices may be dried, for example, at room temperature. In some examples, systems and techniques according to the disclosure may be used to deposit one or more conductive compositions to ultimately fabricate an electronic device. Thus, systems and techniques according to the disclosure may allow fabrication of devices (for example, electronic devices), components, or structures (for example, medical or biological structures) by additive manufacturing on unconstrained freeform build surfaces, for example, under ambient conditions of temperature and pressure.

FIG. 1 is a conceptual drawing of an example system 10 for additively manufacturing a component 12 on a substrate 14. Component 12 may include a device (for example, an electronic device), a structure (for example, a medical, biological, or biocompatible structure), or any object to be fabricated. System 10 includes a controller 40 for controlling the operation of system 10, for example, by controlling one or more components of system 10 or substrate 14.

Substrate 14 defines an unconstrained freeform build surface 16. An unconstrained surface is a surface that is free to move with one or more degrees of freedom, such as 6 degrees of freedom. A freeform surface is a surface with an arbitrary shape, including planes, curves, contours, or the like. In some examples, build surface 16 may include a flat or relatively flat surface, for example, exhibiting a contour deviation of less than 100 mm/m, or 10 mm/m, or 1 mm/m, or 0.1 mm/m. In other examples, build surface 16 may define a curved or contoured surface, for example, including one or more piecewise curvilinear or contoured surface regions.

Build surface 16 may include a rigid, semi-rigid, or relatively soft material, or combinations thereof. For example, substrate 14 may include one or more of metal, alloy, glass, fabric, paper, leather, polymer, rubber, ceramic, gel, biological, or biomimetic material.

In some examples, build surface 16 may define a deformable surface. For example, build surface 16 may inflate, deflate, bend, stretch, compress, flex, relax, or otherwise change shape during deposition of material on build surface 16. In some examples, build surface 16 includes a region of a body, for example, skin or tissue. For example, build surface 16 may include a region of a hand or forearm, for example, a wrist, a palm, a dorsum, a finger, a thumb, or any other region of a hand.

In some examples, build surface 16 optionally may be provided with a build promoting layer, for example, an adhesive or tacky layer or coating that may promote or facilitate the deposition of a first layer, first few layers, or bottom of additively deposited material to component 12. In some examples, the build promoting layer may include a tacky, compliant, or flexible polymer. In some examples, the build promoting layer may include silicone grease or a silicone coating or layer.

System 10 may include a frame 18. Frame 18 may include an open, partially-closed, or enclosed housing, one or more struts or connectors, sheets, panels, shields, or other structures for supporting at least one material repository 20, dispenser 22, or both. In some examples, frame 18 may include a structural material, such as metal, alloy, glass, polymer, wood, ceramic, or combinations thereof.

Frame 18 may be dimensioned to accept and accommodate at least build surface 16 of substrate 14 into an interior of frame 18. For example, build surface 16 may be positionable adjacent dispenser 22 within or adjacent frame 18 so that dispenser 22 is directable towards build surface 16. In some examples, frame 18 may include a delta robot, a Stewart platform, an industrial robot, a cartesian coordinate robot, a robotic arm or any other robot, or otherwise be configured to allow relative motion between dispenser 22 and build surface 16, or to provide dispenser 22 with three to six degrees of freedom relative to build surface 16.

In some examples, frame 18 includes a platform or a base 19. In some examples, substrate 14 may be placed on or in contact with base 19, or be supported by base 19, and component 12 may be fabricated on build surface 16 of substrate 14. In other examples, substrate 14 may be maintained substantially parallel to base 19 or in a region between base 19 and dispenser 22. In some examples, substrate 14 may be supported by or mechanically coupled to a portion of frame 18. In other examples, substrate 14 may not substantially contact frame 18, but may be supported by or coupled to a rest or structure spaced from frame 18 (for example, a vise, a clip, or the like). In still other examples, substrate 14 may include a portion of person's body, and may be supported by the body within frame 18, either alone or by resting on a portion of frame 18 (e.g., base 19).

Material repository 20 is configured to hold at least one composition. For example, material repository 20 may include a chamber for holding the at least one composition. The composition may be any suitable additively depositable or extrudable composition for fabricating component 12 or a portion of component 12. For example, the composition may include a functional composition or a non-functional composition. The composition may include nanoparticles, particles, a polymer, a resin, a binder, a silicone, a metal, an alloy, a ceramic, a glass, a liquid, a gel, a biological material, a biocompatible material, a bioresorbable material, biological cells, tissue, or combinations thereof.

In some examples, the composition includes an electrically conductive composition. For example, the composition may include conductive particles dispersed in a matrix. In some examples, the composition includes silver particles.

In some examples, material repository 20 may be configured to hold two or more compositions, for example, in corresponding chambers. For example, a first composition may be electrically conducting, while a second composition may be relatively electrically insulating or substantially electrically non-conductive. In addition to, or instead of, differences in conductivity, different compositions may exhibit differences in flexibility, hardness, flowability, crystallinity, or any other suitable property.

In some such examples, a single dispenser 22 may be fluidically coupled to multiple chambers, and a selected composition of the two or more compositions may flow through the same dispenser 22 at different build intervals or times, e.g., by controlling a valve or other flow control device between dispenser 22 and material repository 20. In other examples, at least one dispenser 22 may include respective two or more dispensers, each nozzle fluidically coupled to a corresponding chamber, and different compositions may be dispensed through different dispensers of at least one dispenser 22. At least one dispenser 22 may include one or more of an extrusion nozzle, a jet nozzle, an aerosol nozzle, an inkjet nozzle, a vacuum nozzle, or any suitable nozzle. In some examples, at least one dispenser 22 may include a pick-and-place element, for example, a vacuum pick-and-place element.

Material repository 20 is fluidically coupled to dispenser 22 (for example, by a channel) so as to allow the composition to flow out from, to spray out from, to be jetted out from, to be forced out from, to be extruded from, or to be otherwise dispensed out from dispenser 22 towards build surface 16. The channel may include one or more separate lumens for directing flow of one or more material from material repository 20 to a respective nozzle of at least one dispenser 22.

In some examples, material in material repository 20 may remain in an uncured (curable) state until it is extruded from dispenser(s) 22 to be exposed to air, oxygen, or an atmosphere that promotes curing after extrusion from dispenser(s) 22. In some examples, two parts of a two-part curable composition may remain unmixed or separated in material repository 20, and may be mixed to promote curing during or immediately after extrusion, for example, by mixing in a lumen of dispenser(s) 22 or at a tip of dispenser(s) 34. In some examples, material in material repository 20 may be thermally curable and one or more of material repository 20 or dispenser 22 may include heating elements, for example, thermal coils, to heat material in material repository 20 or material flowing along and out of dispenser 22 to a predetermined temperature to cause curing of the material. In some examples, material in material repository 20 may be photocurable and one or more of material repository 20 or dispenser 22 may include light-emitting elements, for example, LEDs, ultraviolet (UV) lamps, lasers, or suitable light sources emitting predetermined curing wavelengths to cause photocuring of material.

Thus, material from material repository 20 may be extruded from dispenser 22 and dried or cured to deposit one or more regions of component 12.

In some examples, material repository 20 may be coupled to or supported on frame 18 at one or more carriages 24. Carriages 24 may be linearly movable along one or more struts, connectors, rails, rods, or the like, of frame 18. For example, system 10 may include three carriages 24, as shown in FIG. 1. However, in other examples, system 10 may include two, three, or more carriages 24. Carriages 24 may be independently movable to ultimately cause one or both of material repository 20 or dispenser 22 to reorient or move relative to build surface 16 or frame 18. For example, material repository 20 may be mounted to respective carriages 24 via rigid or semi-rigid connectors 26, such that movement of carriages 24 results in corresponding movement and reorientation of connectors 26, ultimately causing one or both of material repository 20 or dispenser 22 to reorient or move. In some examples, carriages 24 may allow dispenser 22 to substantially travel along any predetermined line, contour, or surface along build surface 16, or within or adjacent to frame 18. In some examples, system 10 may include one or more motors, for example, a servomotor, configured to cause carriages 24 to move along frame 18. In some examples, the relative positions of carriages 24 may be changed to move or reorient dispenser 22 with respect to build surface 16, so that dispenser 22 may deposit material at a region on build surface 16 or on a previously deposited structure on build surface 16. Thus, dispenser 22 may deposit the composition from material repository 20 onto build surface 16 in any suitable pattern, for example, a pattern ultimately resulting in fabrication of component 12.

System 10 includes at least one sensor 28. At least one sensor 28 may include any sensor suitable for sensing a position, orientation, deformation, or combinations thereof, of build surface 16. For example, at least one sensor 28 may include an optical sensor, a thermal sensor, an electric sensor, a biological sensor, or combinations thereof. An optical sensor may include a camera, a light scanner, a three-dimensional scanner, a structured light scanner, a charge coupled device (CCD), a complementary metal oxide semiconductor (CMOS) device, or any suitable imaging sensor. A thermal sensor may be configured to sense temperature of build surface 16 as a function of position across build surface 16. For example, a thermal sensor may include an infrared sensor. An electric sensor may be configured to sense charge, electric field, voltage, or the like as a function of position across build surface. A biological sensor may be configured to sense biological phenomena, such as fluorescence, as a function of position across build surface 16. In some examples, at least one sensor 28 includes multiple sensors and/or multiple types of sensors that may or may not be synchronized to each other or may generate time-stamped data so that data may be aggregated from multiple sensors.

In some examples, the at least one sensor 28 may include at least one dense 3D sensor and at least one sparse 3D sensor. The at least one dense 3D sensor may include one or more depth sensors, one or more 3D scanner, or combinations thereof configured to generate dense sensor data used to generate a 3D point cloud of build surface 16. For example, the at least one dense 3D sensor may be configured to sense build surface 16 based on a triangulation-based method, a time-of-flight method, an optical coherence tomography method, or the like. The 3D point cloud of build surface 16 may be used as the initial or baseline shape, position, and/or orientation of build surface 16.

The at least one sparse 3D sensor may include any of the types of sensor described above and may be used to generate sparse sensor data indicative of at least one registration feature 36 in real-time or near real-time.

At least one sensor 28 may be configured to image any region within an interior of frame 18, adjacent to frame 18, or adjacent substrate 14, build surface 16, or material repository 20. In some examples, at least one sensor 28 may be mounted to frame 18, for example, by a rail 30, or the like. In other examples, at least one sensor 28 may be spaced from frame 18. At least one sensor 28 is configured to image at least one registration feature 36, for example, registration feature 36 on build surface 16. As discussed elsewhere in the disclosure, system 10 may use at least one registration feature 36 to determine or track a three-dimensional (3D) trajectory and/or deformation of build surface 16, for example, relative to dispenser 22. In some examples, controller 40 may be configured to generate a point cloud model of build surface 16, based on image date received from at least one sensor 28. In some such examples, controller 40 may be configured to determine the 3D trajectory and/or deformation by at least comparing a first point cloud model at a first time to a second point cloud model at a second time, or by adapting a point cloud model based on position data associated with at least one registration feature 36.

In some examples, at least one sensor 28 includes a component imaging device. For example, at least one sensor 28 may be configured to image an as-deposited pattern of component 12 deposited by nozzle 22, for example, on or adjacent build surface 16. For example, at least one sensor 28 may include a camera, a charge coupled device (CCD), a complementary metal oxide semiconductor (CMOS) device, or any suitable imaging sensor.

In some examples, instead of or in addition to at least one sensor 28, system 10 may include at least one surface tracking device 32. Surface tracking device 32 may include an imaging device similar to at least one sensor 28 and may be configured to track build surface 16. For example, surface tracking device 32 may include any sensor described above with respect to at least one sensor 28. In some examples, surface tracking device 32 may be secured to or coupled to material repository 20 or at least one dispenser 22, for example, via one or more device connectors 34. Thus, in some such examples, surface tracking device 32 may move in a fixed orientation or spacing relative to material repository 20 and move with material repository 20. In some examples, instead of, or in addition to at least one sensor 28, surface tracking device 32 may be configured to image build surface 16 or at least one registration feature 36. For example, surface tracking device 32 may track or image build surface 16 or at least one registration feature 36, while at least one sensor 28 may include a component imaging device monitoring component 12 being deposited on build surface 16. In some examples, surface tracking device 32 is configured to track build surface 16 based on the relative location of registration features 36. In some examples, system 10, for example, one or both of at least one sensor 28 or surface tracking device 32, may include a light source, for example, a source configured to emit predetermined wavelengths or wavelength bands towards one or more of component 12, build surface 16, or at least one registration feature 36, and such that light reflected or retroreflected by one or more of component 12, build surface 16, or at least one registration feature 36 may be sensed, detected, or imaged by at least one sensor 28 or surface tracking device 32.

System 10 includes controller 40 for controlling the additive manufacturing or deposition. For example, controller 40 may include a data storage module 42 that stores a build model 44 of component 12 and, optionally, at least one predetermined toolpath for at least one dispenser 22. Model 44 includes a digital representation of component 12. For example, model 44 may include a digital representation of geometry of component 12, material for each volume of component 12, and any other parameters that define component 12 (e.g., identification and location of any non-additively manufactured elements to be incorporated into component 12). In some examples, model 44 may include a representation of a conductive trace of an electronic device. The at least one predetermined toolpath defines movement of the at least one dispenser 22 relative to build surface 16 for forming the component. In some examples, data storage module 42 may store at least one predetermined toolpath for each dispenser, e.g., as part of build model 44.

Each predetermined toolpath may include one or more sequences of waypoints arranged in sequential (e.g., chronological) order. Each waypoint defines a position, velocity, acceleration, and orientation of the dispenser. Each way point also defines a dispensing state of the dispenser (e.g., on/off state, dispensing pressure, dispensing duration, dispensing pulse frequency, or the like). In this way, the waypoints and predetermined toolpath defines motion and dispensing behavior of the respective dispenser with which the predetermined toolpath is associated.

Controller 40 includes control circuitry 46 for controlling system 10. Control circuitry 46 is configured to implement functionality and/or process instructions for execution within controller 40. For example, control circuitry 46 may be capable of processing instructions stored by a storage device in controller 40, such as data storage module 42. Examples of control circuitry 46 may include, any one or more of a microprocessor, a digital signal processor (DSP), an application specific integrated circuit (ASIC), a field-programmable gate array (FPGA), or equivalent discrete or integrated logic circuitry.

For example, controller 40 may send operational signals to and receive status signals from material repository 20, at least one sensor 28, and surface tracking device 32 to control and monitor the operation of additive manufacturing system 10. For example, control circuitry 46 may send control signals to and receive signals from one or more of material repository 20, at least one dispenser 22, carriages 24, at least one sensor 28, or surface tracking device 32. For example, control circuitry 46 may be configured to control at least one dispenser 22 based on model 44 (and based on the trajectory and/or deformation of build surface 16) to cause dispensing of the at least one room-temperature curable conductive composition from at least one dispenser 22 in a predetermined pattern on or adjacent to build substrate 16. The predetermined pattern of the composition defines at least one portion of component 10.

In some examples, controller 40 may be configured to control material repository 20 and at least one dispenser 22 to direct a material composition at a build location on partially fabricated component 12, carried on build surface 16, or at an initial build location on a region of build surface 16. In other examples, controller 40 may be configured to control material repository 20 and at least one dispenser 22 to direct a material composition at a build location on a damaged component to effect repair of the damaged component.

Controller 40 may be configured to cause additive manufacturing system 10 to fabricate component 12 by depositing material at different build locations along a predetermined toolpath based on model 44, so that the material is ultimately deposited along a predetermined build direction, for example a vertical build direction upwards (for example, against a gravitational force) or downwards (for example, toward a gravitational force).

In some examples, controller 40 may be configured to account for movement of build surface 16 due to movement of the article of which build surface 16 is a part, due to deformation of the article of which build surface 16 is a part, or both, to cause at least one dispenser 22 to move relative to build surface 16 based on model 44. In some examples, controller 40 may be configured to control material repository 20 and at least one dispenser 22, to deposit a layer or volume of material along a series of build locations to fabricate component 12. Therefore, controller 40 may be configured to direct build location along a two-dimensional or three-dimensional tool path to fabricate component 12 based on model 44.

In some examples, controller 40 may be configured to control at least one sensor 28 or surface tracking device 32 to sense (e.g., image) surfaces or regions or volumes of one or more of component 12 or build surface 16 to generate respective build data (e.g., build images) periodically or substantially continuously. Controller 40 may be configured to periodically or substantially continuously compare the build data with the model 44 to verify that component 10 substantially conforms (e.g., conforms or nearly conforms) to model 44.

Controller 40 may also be configured to determine a three-dimensional (3D) trajectory and/or deformation of build surface 16, e.g., due to movement and/or deformation of build surface or the article of which build surface is a part. Because build surface 16 is unconstrained, build surface 16 may move. In some examples, build surface 16 alternatively or additionally may deform. If such movement and/or deformation of build surface 16 is not compensated for, as-built component 12 may not conform to model 44, for example, because of misalignment of one or more regions of component 12 resulting from motion and/or deformation of component 12 during deposition. To account for movement, for example, translation or rotation, of build surface 16, and/or deformation of build surface 16, controller 40 may be configured to determine the 3D trajectory and/or deformation of build surface 16. For example, controller 40 may be configured to receive sensor data from at least one sensor 28 or surface tracking device 32 indicative of relative positions or orientations of build surface 16 over time. In some examples, controller 40 may be configured to determine the trajectory and/or deformation by monitoring at least one registration feature 36 on build surface 16 over time.

In some examples, controller 40 may be configured to control one or more of material repository 20 or at least one dispenser 22 based on the build data, the model 44, and the 3D trajectory and/or deformation of build surface 16. The 3D trajectory and/or deformation may include one or more of relative velocity, relative position, relative rigid-body rotation, angular velocity, deformation, or relative orientation of a target deposition region of build surface 16 relative to at least one dispenser 22. For example, controller 40 may be configured to control, based on model 44 and the trajectory and/or deformation, material repository 20, at least one dispenser 22, and/or surface tracking device 32 to translate and/or rotate along at least one axis to position component 12 relative to at least one dispenser 22 and/or surface tracking device 32.

In some examples, controller 40 may be configured to control material repository 20 and/or at least one dispenser 22 to direct deposition of material on build surface 16 or component 12 in a predetermined build direction, for example, a vertical direction pointing away from build surface 16. Thus, controller 40 may be configured to control material repository 20 and/or at least one dispenser 22 to direct material along the build direction, beginning with layers of material on or adjacent build surface 16 and then continuing to deposit layers that are successively farther away from build surface 16. Controller 40 may be configured to account for a movement and/or deformation of build surface 16 during fabrication by determining a trajectory and/or deformation of build surface 16, for example, by sensing build surface 16 using at least one sensor 28 or surface tracking device 32. In some examples, controller 40 may be configured to determine the trajectory and/or deformation by monitoring at least one registration feature 36 on or adjacent to build surface 16.

At least one registration feature 36 may include any feature that is substantially stationary relative to a location on build surface 16 and can be identified by at least one sensor 28 and/or surface tracking device 32. In some examples, at least one registration feature 36 is inherent to build surface 16 or the object of which build surface 16 is a part. For example, at least one registration feature 36 may include a 2D geometric feature of build surface 16; a 3D geometric feature of build surface 16; a thermal feature, such as hot spot or a cold spot, of build surface 16; an electrical feature, such as a local or global maximum or minimum electric field, of build surface 16; a biological feature, such as a fluorescence response, of build surface 16; or the like. In other examples, at least one registration feature 36 may be applied, e.g., temporarily, to build surface 16 to facilitate sensing of the position of build surface 16 by at least one sensor 28 and/or surface tracking device 32.

Figure 2:
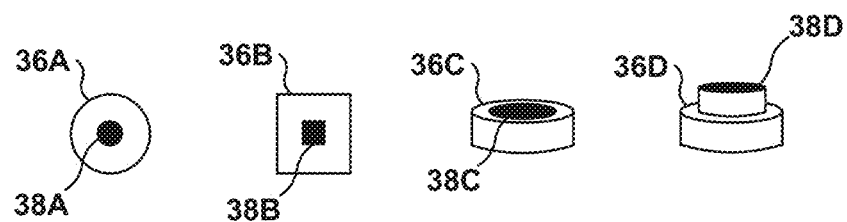
FIG. 2 is a set of conceptual drawings of example registration features.

FIG. 2 is a conceptual drawing of example registration features 36A, 36B, 36C, and 36D. In some examples, each registration feature of registration features 36 has substantially the same shape, structure, and size. In other examples, registration features 36 may define different shapes, sizes, or structures. For example, registration features 36 include at least one circular registration feature 36A. In some examples, registration features 36 include at least one ellipsoidal registration feature. In some examples, registration features 36 include at least one square registration feature 36B. In some examples, registration features 36 include at least one triangular, rectangular, or n-sided polygonal registration feature, where n is an integer greater than two. The at least one polygonal registration feature may define a convex polygon, or a concave polygon. In some examples, the concave polygon may include an m-pointed star, where m is greater than 2. The at least one polygonal registration feature may define at least one axis of symmetry. In some examples, at least one registration feature of registration features 36 may be substantially thin, and define a relatively low thickness in a direction orthogonal to a major surface of the at least one registration feature. For example, registration features 36 may include at least one of a label, a sticker, a decal, a fiducial marker, a printed pattern, or a temporary tattoo. In some examples, the at least one registration feature may be retroreflective or reflective. The surface feature may include a feature defined by build surface 16, or by a component adjacent build surface 16. The surface feature may include at least one of a raised feature, a depression, a protrusion, a pedestal, a contoured feature, an inked, dyed, or colored feature, or combinations thereof. In other examples, at least one registration feature of registration features 36 may be thick. For example, registration features 36 may include at least one puck-shaped (or cylindrical) feature 36C, which may define circular or ellipsoidal major surfaces defining a thickness therebetween. In some examples registration features 36 may include at least one tiered feature 36D which may include a base and a riser, or a suitable protruding structure.

In some examples, registration features 36 may include an adhesive or tacky surface or layer, to promote adhesion of registration features to build surface 16. In some examples, registration features 36 may be otherwise retainable by build surface 16, for example, by gravity, at least during fabrication of component 12. Thus, one or more registration features 36 may be placed on or adjacent build surface 16 before fabrication of component 12 is initiated and may be removed after fabrication of component 12 is completed.

Registration features 36 may include at least one major surface that may be detectable by imaging, for example, by imaging device 28, or by surface tracking device 32. For example, the at least one major surface may be substantially bright, reflective, or retroreflective, and present a contrast with surrounding regions of build surface 16. The at least one major surface may have substantially a single color or may be multi-colored or patterned. The at least one major surface may white, green, black, or have any suitable color detectable by imaging device 28, or by surface tracking device 32. In some examples, the at least one major surface may appear transparent in visible wavelengths and may be detectable to ultraviolet or infrared sensors.

In some examples, registration features 36 may include a pattern including a relatively darker region surrounded by a relatively brighter region. For example, the at least one major surface of registration feature 36A may include a dark interior region 38A surrounded by a bright peripheral region, or vice versa. Similarly, registration features 36B, 36C, or 36D may include dark interior region 38B, 38C, or 38D. In some examples, the pattern may be concentric, as shown in FIG. 2. In other examples, the inner region may define a periphery having a different shape from a periphery of the outer region. In some examples, the pattern may include any suitable pattern of regions having different, contrasting, gradient, or transitioning colors, hues, or shades. In some example, the pattern may include a bar code, for example, a linear barcode, or a two-dimensional barcode, for example, a quick-response (QR) code.

In examples in which registration features 36 include more than one registration feature, respective registration features may be placed on build surface 16 in any predetermined pattern, for example, along any open or closed convex or concave polygon, curve, or line. For example, at least one registration feature 36 may include a plurality of registration features disposed in a predetermined pattern on build surface 16.

Figure 3:
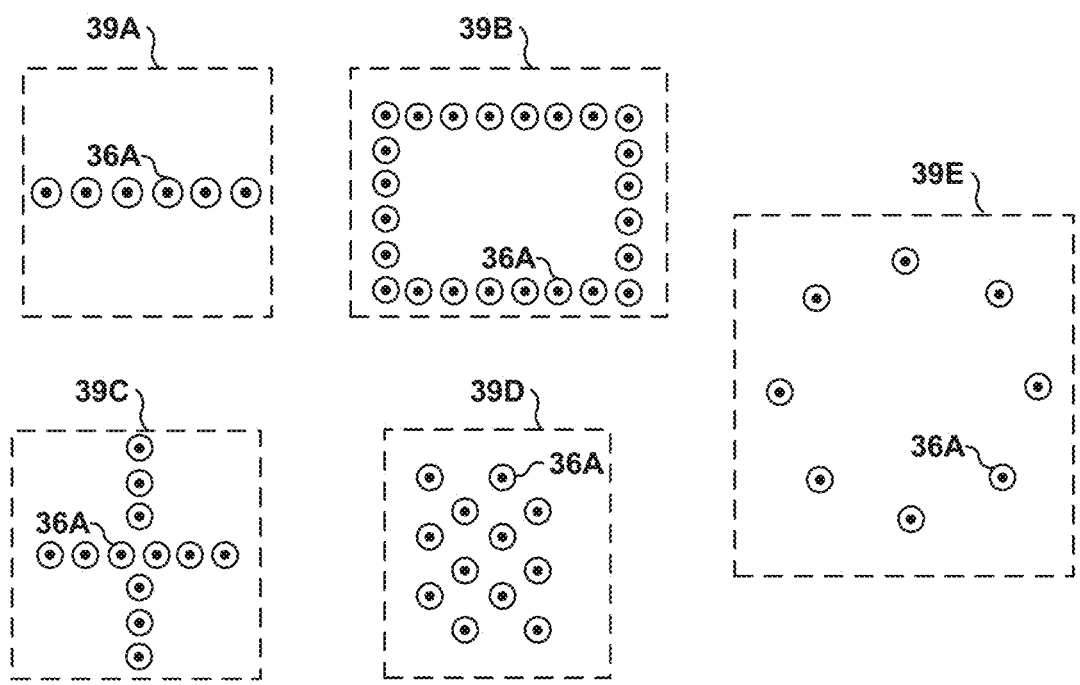
FIG. 3 is a set of conceptual drawings of example arrangements of registration features.

FIG. 3 is a conceptual drawing of example arrangements of registration features 39A, 39B, 39C, 39D, and 39E. Arrangement 39A includes registration features 36 (for example, registration features 36A) placed along a straight line. Arrangement 39B includes registration features 36 (for example, registration features 36A) placed along a rectangle. Arrangement 39C includes registration features 36 (for example, registration features 36A) placed along a cross. Arrangement 39D includes registration features 36 (for example, registration features 36A) placed along a grid. Arrangement 39E includes registration features 36 (for example, registration features 36A) placed along a circle. The arrangement of registration features 36 may include substantially identical registration features, as shown in FIG. 3, or registration features having different sizes, shapes, colors, reflectance, retroreflectance, or other optical properties, structures, or patterns. In some examples, registration features 36 may be placed about a region on build surface 16 on which component 12 is to be fabricated. In some examples, system 10 may determine a contour of build surface 16 based on differences in intensity of wavelengths reflected by registration features 36, or by generating a point cloud model of build surface 16 including locations of registration features 36.

System 12 may thus sense registration features 36 to track, monitor, or identify build surface 16, for example, to determine a trajectory (for example movement) or form (for example, surface geometry or contour) and/or deformation of build surface 16 within or adjacent frame 18, and based on the trajectory and/or deformation, build component 12 on unconstrained freeform build surface 16.

Figure 4A:
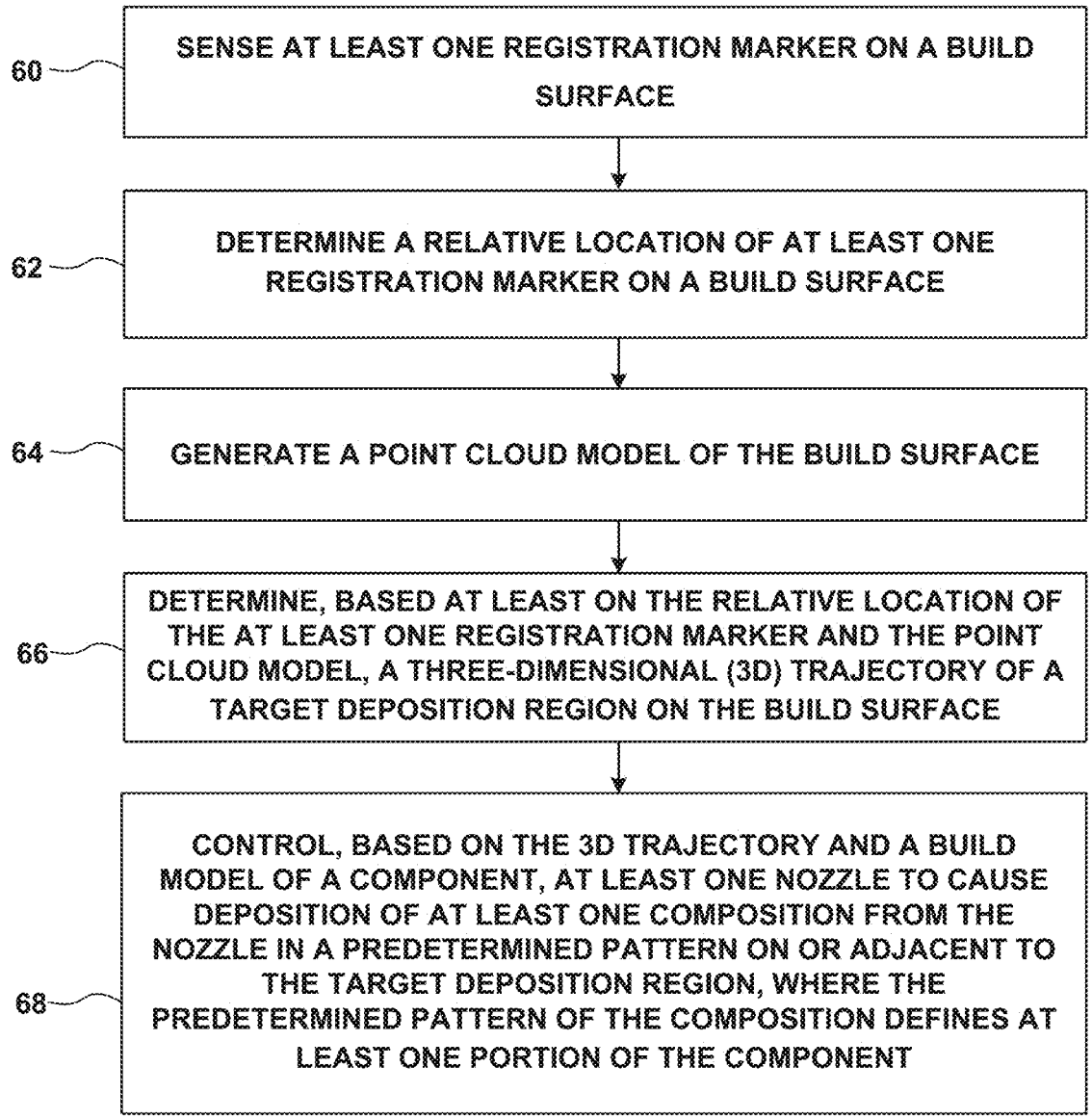
FIG. 4A is a flow chart illustrating an example technique for additively manufacturing a component on an unconstrained freeform build surface.

FIG. 4A is a flow chart illustrating an example technique for additively manufacturing component 12 on unconstrained freeform substrate 14. While the technique of FIG. 4A is described with reference to the example system of FIG. 1 and registration features of FIGS. 2 and 3, the technique of FIG. 4A may be performed using other systems or registration features.

In some examples, the example technique includes sensing at least one registration feature 36 on build surface 16 (60). For example, control circuitry 46 may control at least one sensor 28 and/or surface tracking device 32 to image at least one registration feature 36 on build surface 16 (60). Control circuitry 46 may receive sensor data from at least one sensor 28 and/or surface tracking device 32. Control circuitry 46 then may determine, based on the sensor data, a relative location of at least one registration feature 36 on build surface 16 (62). For example, control circuitry 46 may compare an apparent or sensed size of registration features 36 with a predetermined reference size associated with a predetermined distance, to determine relative location. For example, an increase in the sensed size of a registration feature compared to the reference size may be indicative of a distance less than the predetermined distance, while a decrease in sensed size of the registration feature may be indicative of a distance greater than the predetermined distance.

In examples in which build surface 16 includes a deformable surface, control circuitry may determine deformation in build surface 16 over time, for example, during printing or material deposition, by tracking one or more registration features of registration features 36. For example, at least one sensor 28 or surface tracking device 32 may sense registration features 36 on a deformable surface, and control circuitry may generate a plurality of point cloud models of different deformation primitives/modes of the deformable surface. Control circuitry 46 may determine a continuous computational model representing the deformation of the deformable surface based on the point cloud data. During deposition, at least one sensor 28 or surface tracking device 32 may image registration features 36 on the deformed build surface. Control circuitry 46 may determine the three-dimensional locations of positions of each registration feature, and feed them as input to the previously generated computational model of deformation, to generate a deformed 3D trajectory and/or deformation as an output. In this way, control circuitry 46 may compensate for deformation of a deformable build surface.

In some examples, control circuitry 46 may compare an apparent or imaged brightness of registration features 36 with a predetermined reference brightness associated with a predetermined reference distance. For example, an imaged brightness greater than the reference brightness may be indicative of a distance less than the predetermined distance, while an imaged brightness lower than the reference brightness may be indicative of a distance greater than the predetermined distance. In some examples, control circuitry may compare relative sizes or relative brightnesses of different registration features of registration features 36, which may be indicative of relative distance between the registration features.

The example technique of FIG. 4A includes generating a point cloud model of build surface 16 (64). Generating a point cloud model of build surface 16 (64) may occur before or after sensing at least one registration feature 36 on build surface 16 (60) and determining, based on the sensor data, a relative location of at least one registration feature 36 on build surface 16 (62). For example, control circuitry 46 may generate the point cloud model based on sensor data received from at least one sensor 28 (or surface tracking device 32) or based on the relative location of at least one registration feature 36. In some examples, the relative location may be determined relative to a predetermined location on frame 18, or on base 19. For example, frame 18 or base 19 may include a marker or feature, and the relative location may be determined with reference to the marker or feature. In some examples, the example technique may include determining, by control circuitry 46, a 3D trajectory and/or deformation by at least comparing a first point cloud model at a first time to a second point cloud model at a second time. In some examples, the technique optionally includes generating a point cloud model of as-built component 12, for example, partially built component 12, on build surface 16. For example, control circuitry 46 may generate the point cloud model of component 12 based on image data received from at least one imaging device 28 (or surface tracking device 32). Control circuitry 46 may compare the point cloud model of component 12 with model 44 to determine a pattern for depositing material from material repository 20, for example, based on the point cloud model of build surface 16.

The example technique includes determining, by control circuitry 46, based at least on the relative location of the at least one registration feature 36 and the point cloud model, a three-dimensional (3D) trajectory and/or deformation of a target deposition region on build surface 16. For example, control circuitry 46 may compare a present relative location of the at least one registration feature 36 with a past stored location of the at least one registration feature 36. The 3D trajectory and/or deformation may include one or more of relative velocity, relative position, relative rigid-body rotation, angular velocity, relative deformation, or relative orientation of the target deposition region relative to the nozzle. For example, control circuitry 46 may determine relative linear translation or rotation of one or more registration features 36 to determine the 3D trajectory and/or deformation. In some examples, control circuitry 46 may use sensor data from at least one sensor 28 or surface tracking device 32 to track or determine the trajectory and/or deformation of build surface 16. For example, in addition to, or instead of, tracking registration features 36, control circuitry 46 may compare changes in relative location and orientation of the point cloud models of component 12 or build surface 16 to determine the 3D trajectory and/or deformation of build surface 16. For example, control circuitry 46 may compare changes in locations or positions of respective registration features over time to establish a 3D trajectory and/or deformation, such as translation or rotation of respective registration features over time. In some examples, control circuitry 46 may compare changes in size or orientation of an arrangement or pattern of registration features 36 as a whole over time to establish the 3D trajectory and/or deformation, such as translation or rotation of an arrangement or pattern of registration features 36.

The technique of FIG. 4A includes controlling, based on the 3D trajectory and/or deformation and model 44, at least one dispenser 22 to cause dispensing of the at least one composition from at least one dispenser 22 in a predetermined pattern on or adjacent to the target deposition region on build surface 16 (68). The predetermined pattern of the composition defines at least one portion of component 12. In some examples, control circuitry 46 may be configured to control at least one dispenser 22 based on the 3D trajectory and/or deformation, model 44, and the image of the as-deposited pattern of composition 12. For example, control circuitry 46 may control at least one dispenser 22 to deposit material based on model 44 and the 3D trajectory and/or deformation to ultimately deposit a complete component 12 that substantially conforms to model 44, by compensating for movement and geometry of build surface 16 compared to a reference surface model 44 is assumed to be built on. For example, model 44 may be assumed to be built on a flat surface, and control circuitry 46 may control at least one dispenser 22 to account from deviations of contoured build surface 16 from a flat surface. Control circuitry 46 may also control at least one dispenser 22 to account for movement, vibrations, rotation, or translation of build surface 16, for example, inadvertent movement of build surface 16, which may have introduced build errors in the component without such compensation.

Thus, the example technique of FIG. 4A may be used to deposit component 12 based on model 44 on unconstrained freeform build surface 16 by compensating for motion, deformation, and/or geometry of unconstrained freeform build surface 16 during the deposition technique.

Figure 4B:
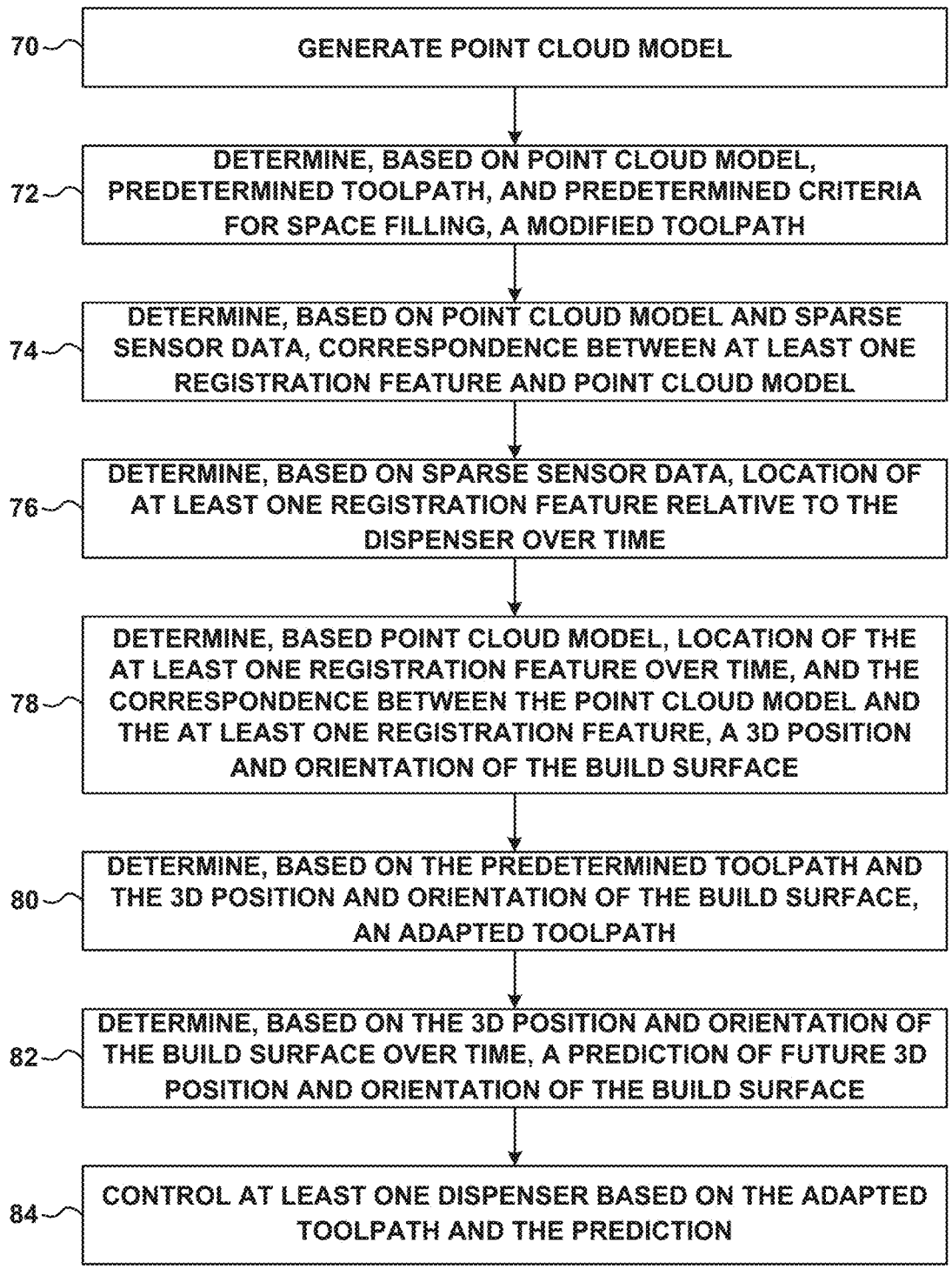
FIG. 4B is a flow chart illustrating another example technique for additively manufacturing a component on an unconstrained freeform build surface.

FIG. 4B is a flow chart illustrating another example technique for additively manufacturing component 12 on unconstrained freeform substrate 14. While the technique of FIG. 4B is described with reference to the example system of FIG. 1 and registration features of FIGS. 2 and 3, the technique of FIG. 4B may be performed using other systems or registration features.

The technique of FIG. 4B includes generating, by control circuitry 46, based on sensor data received from at least one sensor 28, a point cloud model of build surface 16 (70). In some examples, the at least one sensor 28 includes a dense 3D sensor and the point cloud model is a dense point cloud model. The point cloud model may represent a rigid, unconstrained freeform build surface or may include a parameter-varying point cloud model of a deformable, unconstrained freeform build surface.

The technique of FIG. 4B also includes determining, by control circuitry 46, based on the point cloud model, a predetermined toolpath, and a predetermined criteria for space filling, a modified toolpath (72). The predetermined toolpath may be part of model 44 stored by data storage module 42. The predetermined criteria for space filling may indicate the maximum and minimum size of holes to fill on build surface 16. For example, control circuitry 46 may compare point cloud model to the predetermined toolpath to determine holes in build surface 16 that are greater than the minimum size and smaller than the maximum size such that the holes should be filled with material to smooth build surface 16 and facilitate deposition of component 12. The modified toolpath is a toolpath that will be followed by at least one dispenser 22 to modify the morphology of build surface 16, e.g., to fill a crack or imperfection on build surface 16 prior to forming component 12.

The technique of FIG. 4B further includes determining, by control circuitry 46, based on sensor data received from at least one sensor 28 and the point cloud model, a correspondence between at least one registration feature 36 on the build surface 16 and the point cloud model (74). In some examples, the at least one sensor 28 may include sparse 3D sensor, which may be configured to sense at least one registration feature 36 and output sparse sensor data, which may include fewer data points than the dense sensor data. The may enable the sparse 3D sensor to sense positions of at least one registration feature 36 in real-time or near real-time. The correspondence between at least one registration feature 36 on the build surface 16 and the point cloud model fixes the locations of at least one registration feature 36 within the point cloud model for further processing and represents the physical location of at least one registration feature 36 on build surface 16.

The technique of FIG. 4B also includes determining, by control circuitry 46, based on sensor data received from at least one sensor 28 (e.g., the sparse 3D sensor), the location of at least one registration feature 36 relative to at least one dispenser 22 over time (76). For example, control circuitry 46 may receive periodic sensor data from at least one sensor 28 (e.g., the sparse 3D sensor) and determine a sequential or chronological series of locations of at least one registration feature 36 relative to at least one dispenser 22.

The technique of FIG. 4B also includes determining, by control circuitry 46, based on the location of at least one registration feature 36 on build surface 16, the correspondence between at least one registration feature 36 and the point cloud model, and the point cloud model, a 3D position and orientation (e.g., a 3D trajectory) and/or deformation of build surface 16 (78), e.g., relative to a reference frame, such as a coordinate system based on frame 18. In some examples, the 3D position and orientation of build surface 16 may account for deformation of build surface 16 and/or the article of which build surface is a part.

The technique of FIG. 4B also includes determining, by control circuitry 46, based on the predetermined toolpath and the 3D position and orientation of build surface 16, an adapted toolpath for at least one dispenser 22 (80). For example, control circuitry 46 may compare the predetermined toolpath from model 44 to the 3D position and orientation of build surface 16 and rotate and/or translate the predetermine toolpath to coincide with the 3D position and orientation of build surface 16. The adapted toolpath may account for the 3D trajectory and/or deformation of build surface 16, including position, orientation, and/or deformation of build surface 16.

The technique of FIG. 4B also optionally includes determining, by control circuitry 46, based on the series of 3D position and orientation of build surface 16 determined in step (76), a prediction of the future 3D trajectory and/or deformation of build surface 16 (82). The prediction of the future 3D trajectory and/or deformation of build surface 16 may include translation, rotation, and/or shape deformation within a finite future time window, and may be based on the 3D trajectory and/or deformation of build surface 16 over the series of 3D position and orientation of build surface 16.

The technique of FIG. 4B also includes controlling, by control circuitry 46, based on the adaptive toolpath, and optionally the prediction, at least one dispenser 22 to dispense the at least one composition from the at least one dispenser in a predetermined pattern on or adjacent to the target deposition region (84).

Thus, the example technique of FIG. 4B may be used to deposit component 12 based on model 44 on a rigid or a deformable unconstrained freeform build surface 16 by compensating for motion, deformation, and/or geometry of unconstrained freeform build surface 16 during the deposition technique, including optionally predicting future motion, deformation, and/or geometry of unconstrained freeform build surface 16.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, for example, a non-volatile storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

The present disclosure will be illustrated by the following non-limiting examples.

EXAMPLES

Example 1

Example conductive compositions were formulated by adding silver flakes (10 μm, Sigma-Aldrich, St. Louis, Mo.) in poly(ethylene oxide) solution (PEO, $M_w$=1,000,000 Da, Sigma-Aldrich, St. Louis, Mo.) with water and ethanol as solvents, followed by mixing in a planetary mixer (ARE-310, Thinky, Laguna Hills, Calif.) for 15 min and centrifuging for 5 min to remove air bubbles.

Using the high molecular weight PEO as a matrix afforded a relatively high viscosity and good mechanical strength in the final material. The viscosity of the ink was tailored by varying the content of PEO in the solutions from 5 to 15 weight percent (wt. %).

Figure 5A:
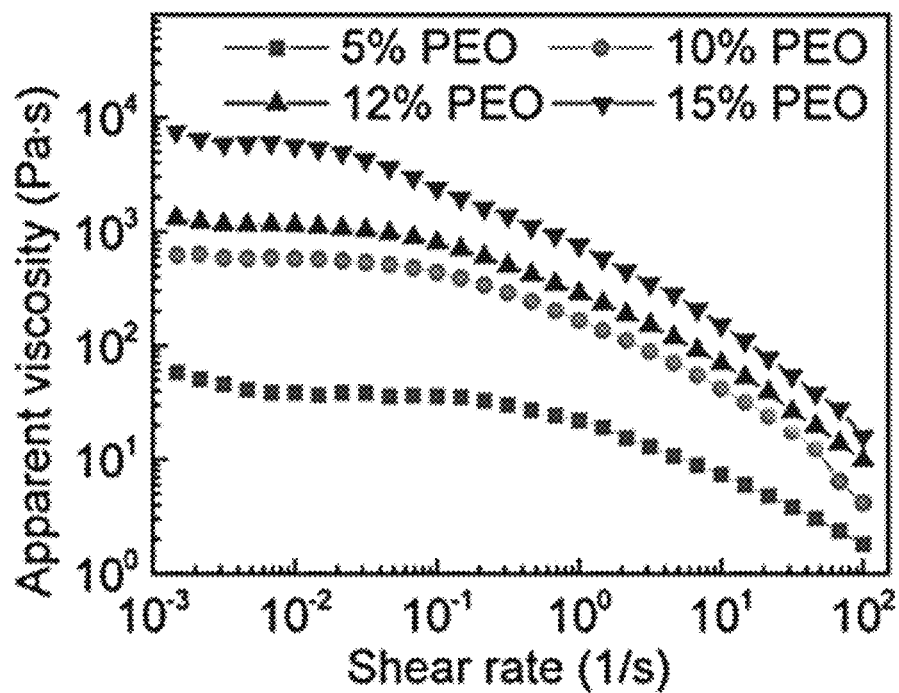
FIG. 5A is an example chart illustrating the relationship between apparent viscosity and shear rate for printing compositions including different concentrations of poly(ethylene oxide) (PEO).

FIG. 5A is a chart illustrating the relationship between apparent viscosity and shear rate for example printing compositions including different concentrations of PEO. As seen in FIG. 5A, all inks exhibited a typical shear-thinning behavior, which may be desirable for controllable extrusion during 3D printing.

Figure 5B:
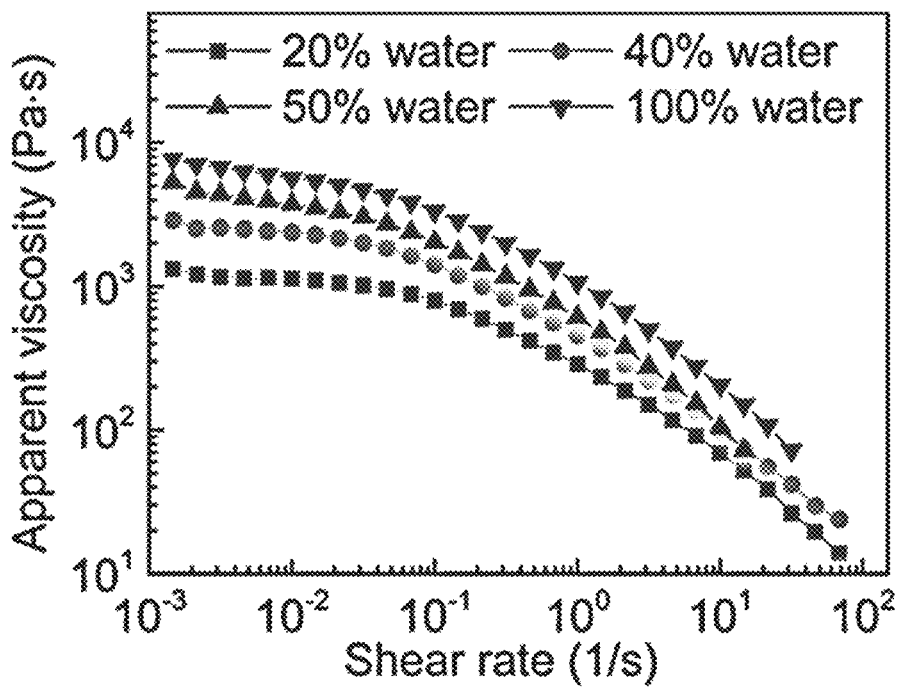
FIG. 5B is a chart illustrating the relationship between apparent viscosity and shear rate for example printing compositions including different concentrations of water.

FIG. 5B is a chart illustrating the relationship between apparent viscosity and shear rate for printing compositions including different concentrations of water. The compositions included 12 wt. % PEO, with 90 wt. % silver in the dried form of the composition.

Figure 5C:
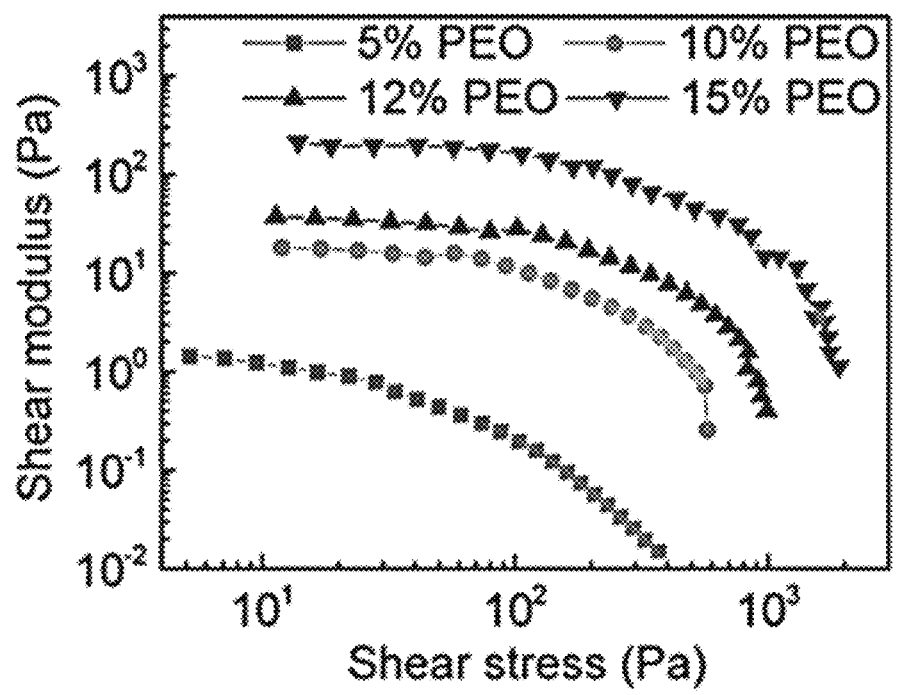
FIG. 5C is a chart illustrating the relationship between shear modulus and shear stress for example printing compositions including different concentration of PEO.

FIG. 5C is a chart illustrating the relationship between shear modulus and shear stress for printing compositions including different concentration of PEO. As seen in FIG. 5C, the compositions exhibited a high shear modulus at low shear stress, helped the compositions retain a filamentary form after printing.

Figure 6:
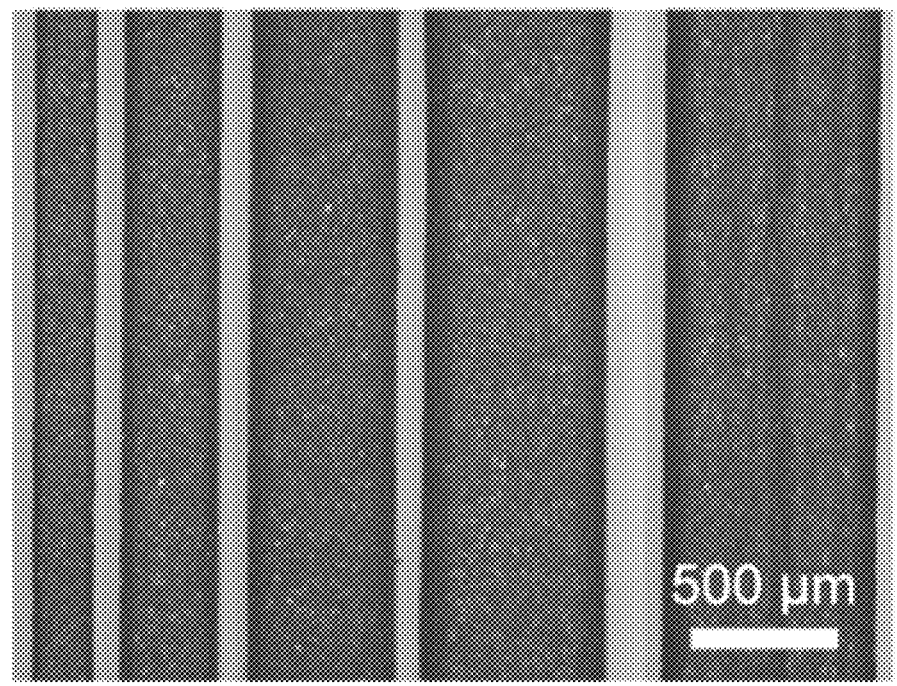
FIG. 6 is a photograph illustrating example printed traces of a composition including 12% by weight of PEO printed at different resolutions.

FIG. 6 is a photograph illustrating printed traces of a composition including 12 wt. % PEO printed at different resolutions. As seen in FIG. 6, the composition exhibited a high shape retention at various printing resolutions. The composition was printable at a relatively fast extrusion speed (~7 mm/s) to reduce print time.

Example 2

Figure 7:
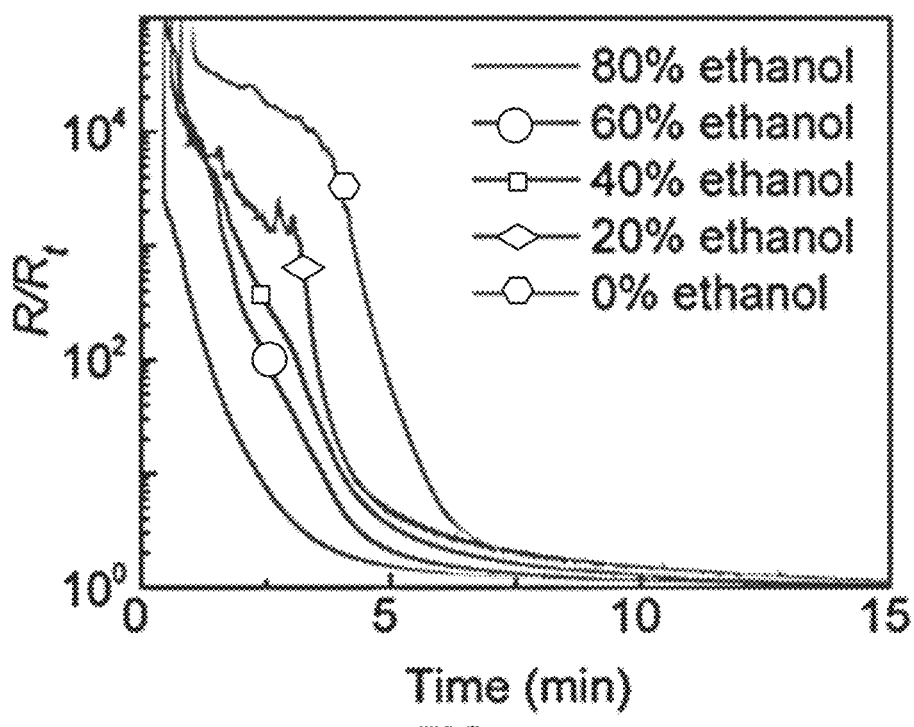
FIG. 7 is a chart illustrating the change in resistance over time for example compositions including different concentrations of ethanol.

The effect of changing the concentration of ethanol on properties of the composition was investigated. Ethanol was added to increase the drying time of the composition and to ultimately increase printing speed. FIG. 7 is a chart illustrating the change in resistance over time for compositions including different concentrations of ethanol. As ethanol content increased from 0 wt. % to 80 wt. % in the solvent, the resistance of the printed electrodes reduced by 90% within 10 min, as seen in FIG. 7.

Example 3

Figure 8:
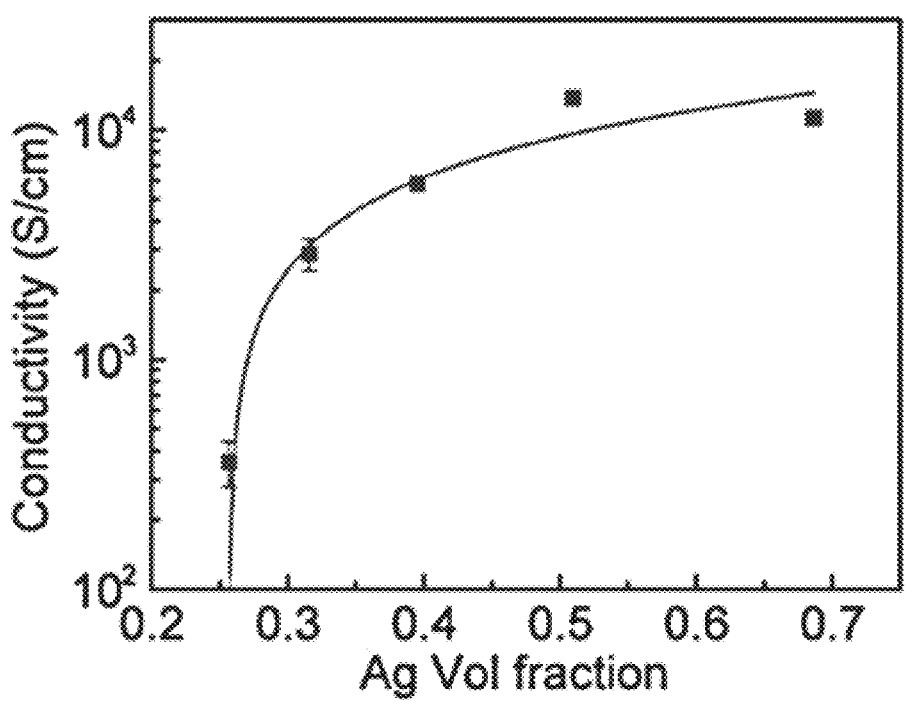
FIG. 8 is a chart illustrating the relationship between volume fraction of silver and electrical conductivity of example dried compositions.

The effect of concentration of silver on the electrical and mechanical properties of the composition was investigated. FIG. 8 is a chart illustrating the relationship between volume fraction of silver and electrical conductivity of example dried compositions. The content of silver flakes determined the electrical conductivity of the ink, which exhibited a typical percolation threshold behavior, as seen in FIG. 8. A power-law theory used to fit the data was given by EQUATION 1.

$$\sigma = \sigma_0 (V_f - V_c)^s \quad \text{(Equation 1)}$$

Here σ is the electrical conductivity of the dried inks, $\sigma_0$ is the power law constant, $V_f$ is the silver volumetric fraction, $V_c$ is the filler critical volume fraction at the percolation threshold, and s is the critical exponent. From the experimental data, $V_c$ and s were found to be 0.257 and 0.771, respectively.

Figure 9A:
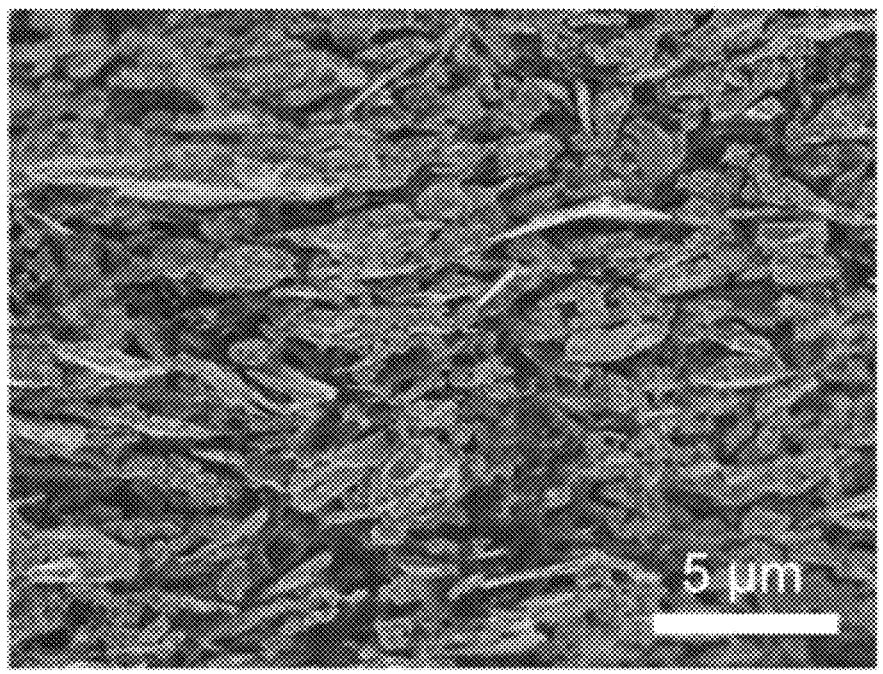
FIG. 9A is a scanning electron microscopy (SEM) photograph illustrating a cross-sectional view of an example filament of a conductive composition including 90% by weight of silver.
Figure 9B:
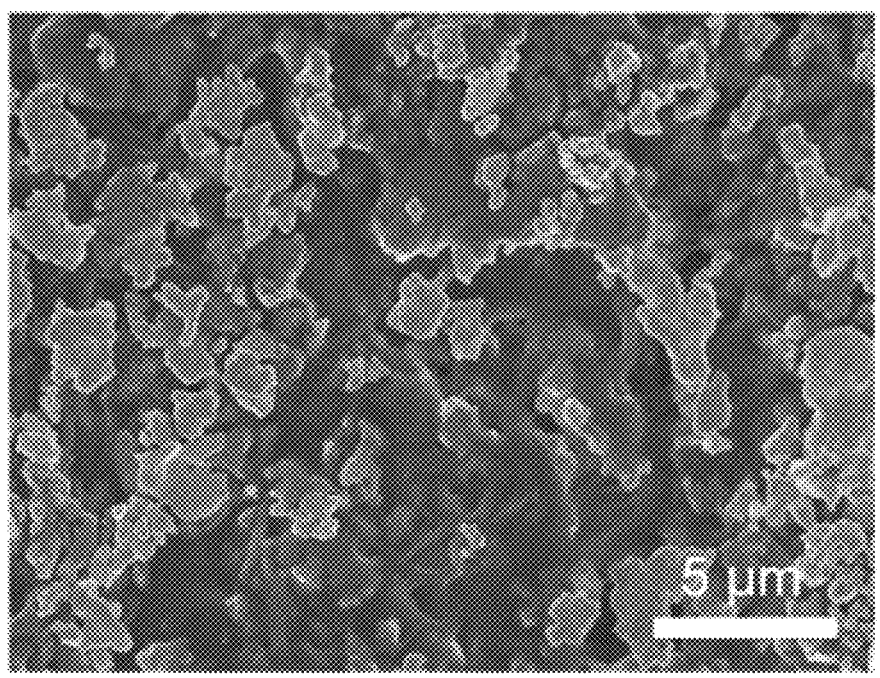
FIG. 9B is a scanning electron microscopy (SEM) photograph illustrating a top view of the example filament of FIG. 9A

The conductivity of the printed electrodes was enhanced by their anisotropic nature, with the cross-sectional and top view scanning electron microscopy (SEM) images of the example filament shown in FIGS. 9A and 9B, respectively. FIG. 9A is a scanning electron microscopy (SEM) photograph illustrating a cross-sectional view of an example filament of a conductive composition including 90 wt. % silver. FIG. 9B is a SEM photograph illustrating a top view of the example filament of FIG. 9A. The shear forces induced by the high extrusion pressure (2-3 MPa) aided in the alignment of the silver flakes along the printing direction, resulting in conductive pathways in the silver-PEO network that improved the conductivity of the printed trace. The ink composed of 90 wt. % Ag exhibited the highest conductivity of $(1.38\pm0.0814)\times10^4$ S cm$^{-1}$, which was only one order of magnitude smaller than that of bulk silver.

Figure 10:
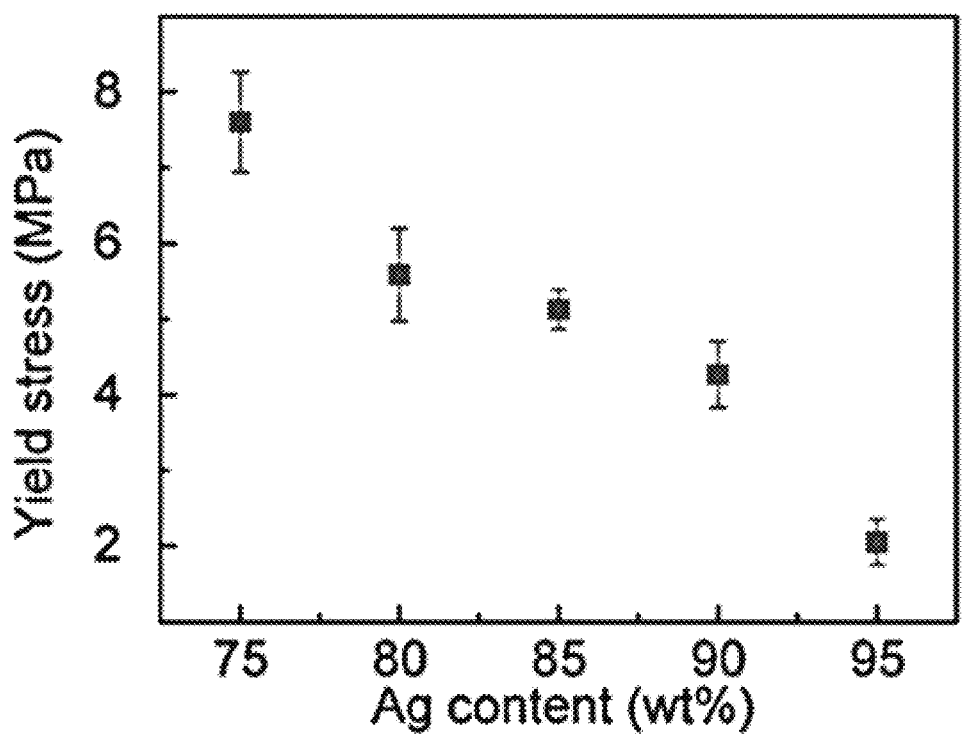
FIG. 10 is a chart illustrating the relationship between yield stress and concentration by weight of silver in example conductive compositions.

FIG. 10 is a chart illustrating the relationship between yield stress and concentration by weight of silver in example conductive compositions. As seen in FIG. 10, yield stress decreased from 7.6 to 4.3 MPa as the silver content increased from 75 wt. to 90 wt. %.

Figure 11:
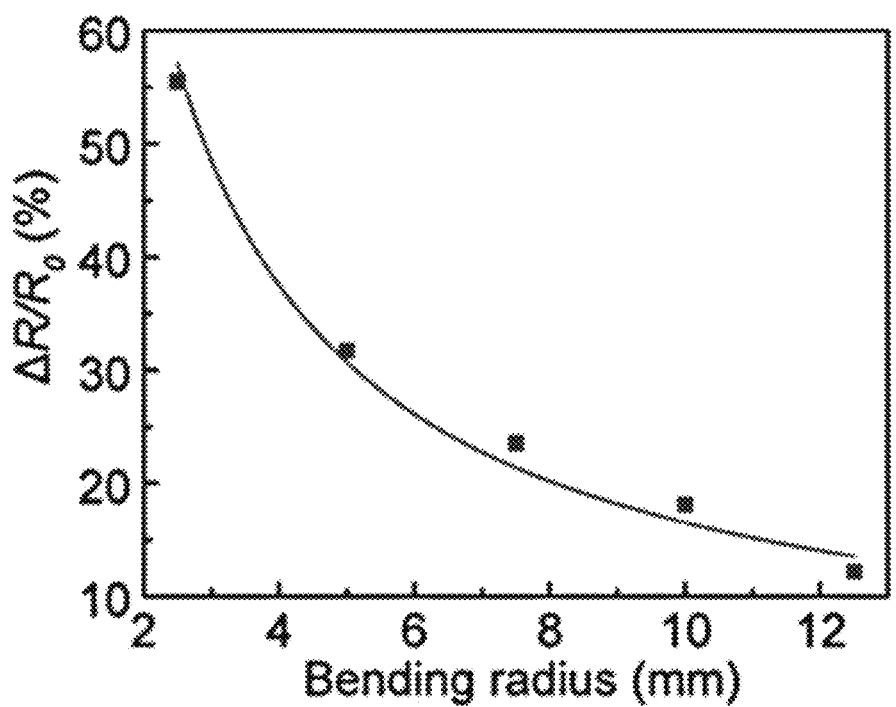
FIG. 11 is a chart illustrating the relationship between resistance and bending radius of an example filament of a conductive composition including 90% by weight of silver.

Since the bending induced from skin or joint movement by the human body may affect the performance of the printed devices, the electrical behavior of the bended filaments was examined. FIG. 11 is a chart illustrating the relationship between resistance and bending radius of a filament of an example conductive composition including 90 wt. % by weight of silver. As seen in FIG. 11, the change in resistance decreased to 10% when the bending radius of the specimen increased to 12 mm, a typical value of human body movement. The results suggested that the conductive ink with fast drying speed, high conductivity, proper mechanical strength, and stable resistance under deformation could yield flexible printed electrodes for wireless devices on skin.

Figure 12:
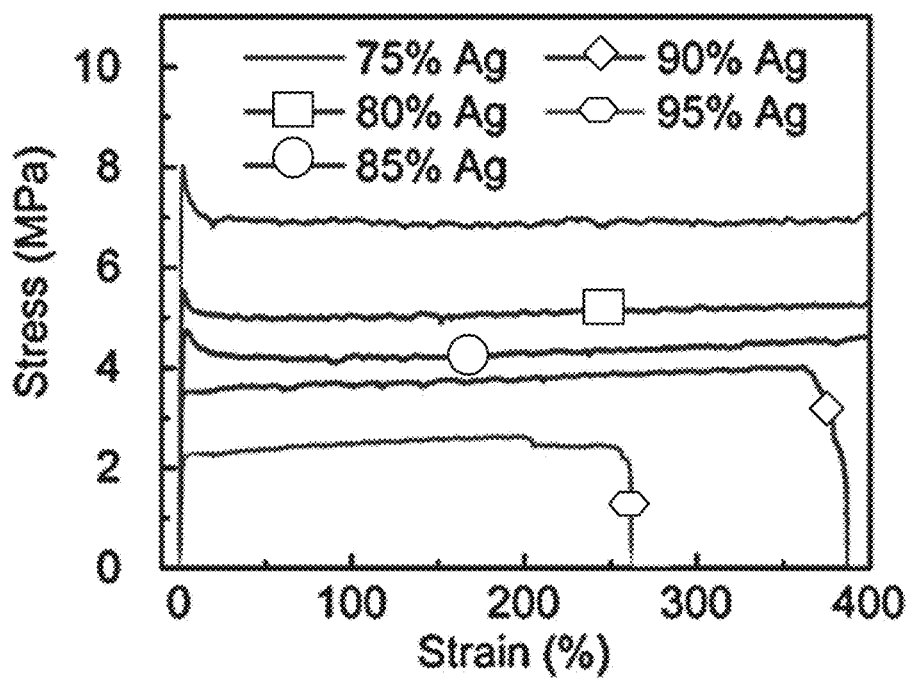
FIG. 12 is a chart illustrating stress-strain curves for example compositions including different concentrations of silver.

FIG. 12 is a chart illustrating stress-strain curves for example compositions including different concentrations of silver. As seen in FIG. 12, the composition with 90 wt. % silver exhibited desirable mechanical performance as well due to the high molecular weight of PEO, showing more than 300% strain at break.

Figure 13:
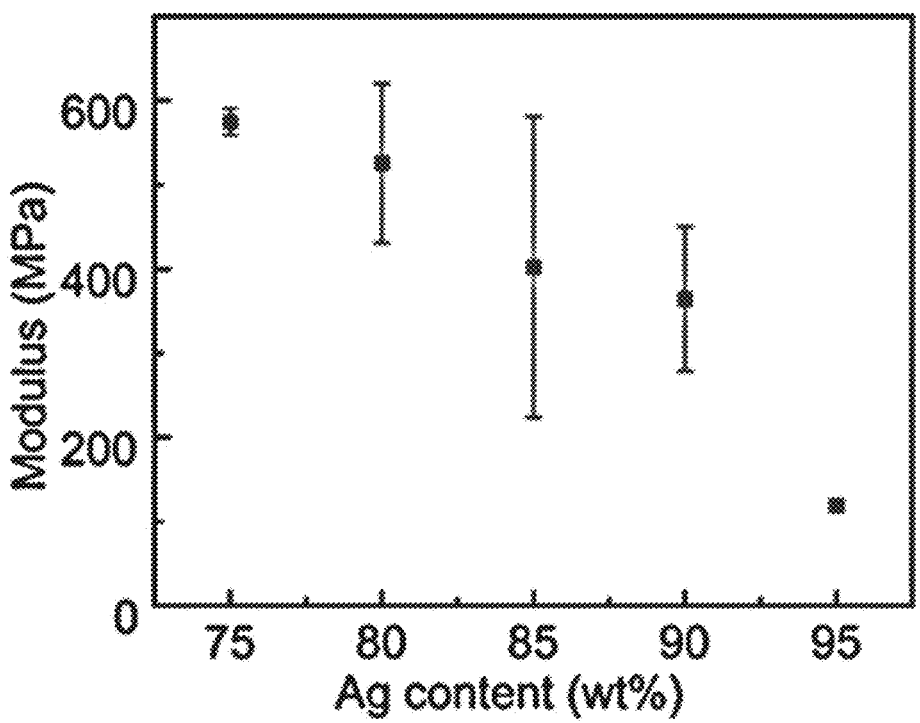
FIG. 13 is a chart illustrating Young's modulus curves for example compositions including different concentrations of silver.

FIG. 13 is a chart illustrating Young's modulus curves for example compositions including different concentrations of silver. As seen in FIG. 13, compositions with about 90 wt. % silver or less had a relatively higher modulus, of greater than 350 to 400 MPa, and up to 600 MPa.

Figure 14:
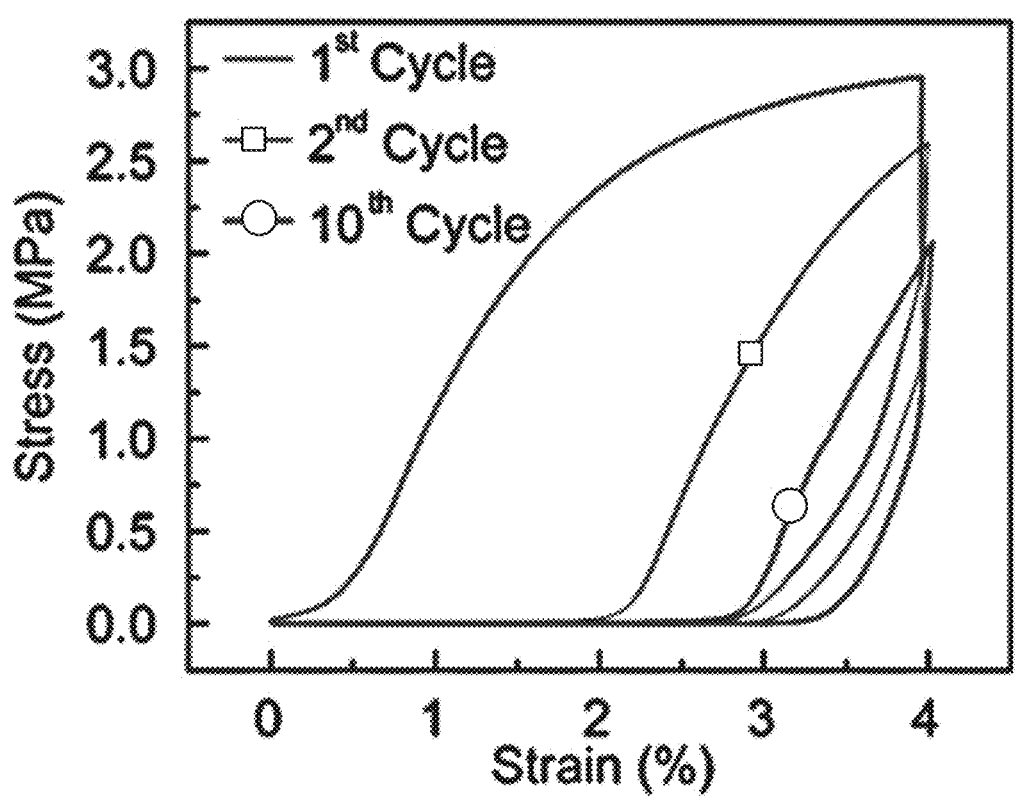
FIG. 14 is a chart illustrating stress-strain curves under cyclic tensile load for an example composition including 90% by weight of silver.
Figure 15A:
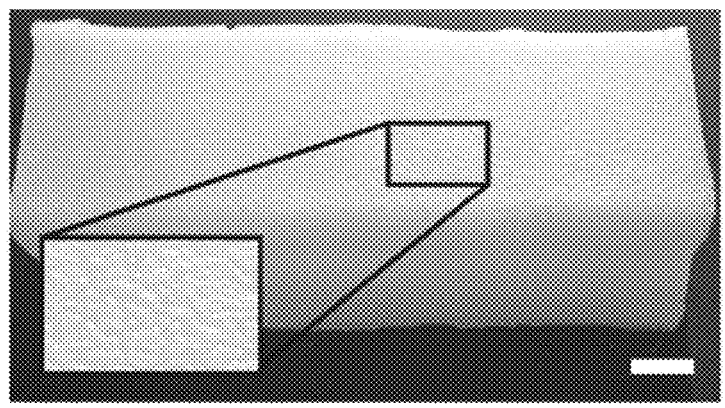
FIG. 15A is a photograph illustrating an example artificial skin used in a cyclic bending test, with an inset illustrating a magnified view of the surface texture.

Cyclic bending tests were performed. FIG. 14 is a chart illustrating stress-strain curves under cyclic tensile load for an example composition including 90 wt. % silver. In the cyclic tensile test, viscoelasticity was observed, with a time delay in returning to the original shape, as seen in FIG. 14. The portion of the specimen that was under plastic deformation extended in size during cycling, shifting the stress-strain curves. FIG. 15A is a photograph illustrating an example artificial skin used in a cyclic bending test, with an inset illustrating a magnified view of the surface texture.

Figure 15B:
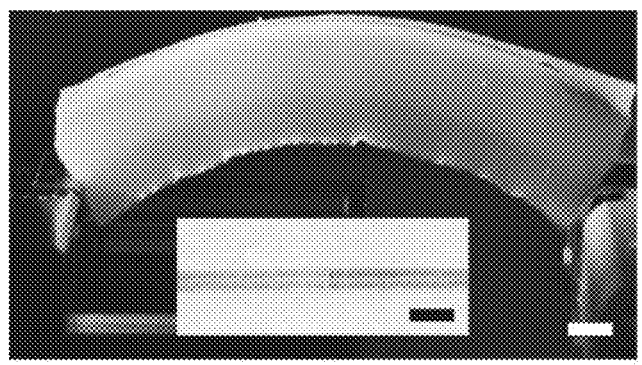
FIG. 15B is a photograph illustrating an example trace printed on the artificial skin of FIG. 15A after 1000 cycles of bending with a minimum radius of 52 mm, with an inset showing a top view of the trace.
Figure 15C:
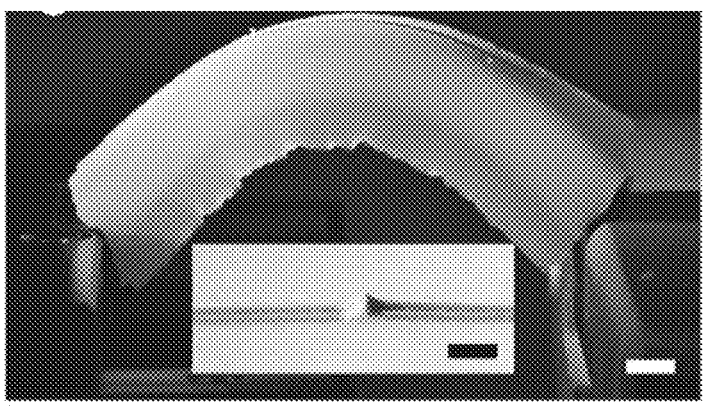
FIG. 15C is a photograph illustrating an example trace printed on the artificial skin of FIG. 15A after 100 cycles of bending with a minimum radius of 32 mm, with an inset showing a top view of the trace.

FIG. 15B is a photograph illustrating a trace printed on the example artificial skin of FIG. 15A after 1000 cycles of bending with a minimum radius of 52 mm, with an inset showing a top view of the trace. FIG. 15C is a photograph illustrating an example trace printed on the artificial skin of FIG. 15A after 100 cycles of bending with a minimum radius of 32 mm, with an inset showing a top view of the trace. The ink maintained good adhesion to artificial skin after 1,000 cycles of bending at a radius of 52 mm, as seen in FIG. 15B. Local buckling of the printed trace was observed when the cyclic bending radius reduced to 32 mm, as seen in FIG. 15C. Similar phenomena were also observed upon repetitive stretching of a trace printed on human skin at the metacarpophalangeal joint, as an extreme deformation case compared to the skin on the back of a hand. These mechanical properties facilitated printing of devices on human skin.

Example 4

Figure 16:
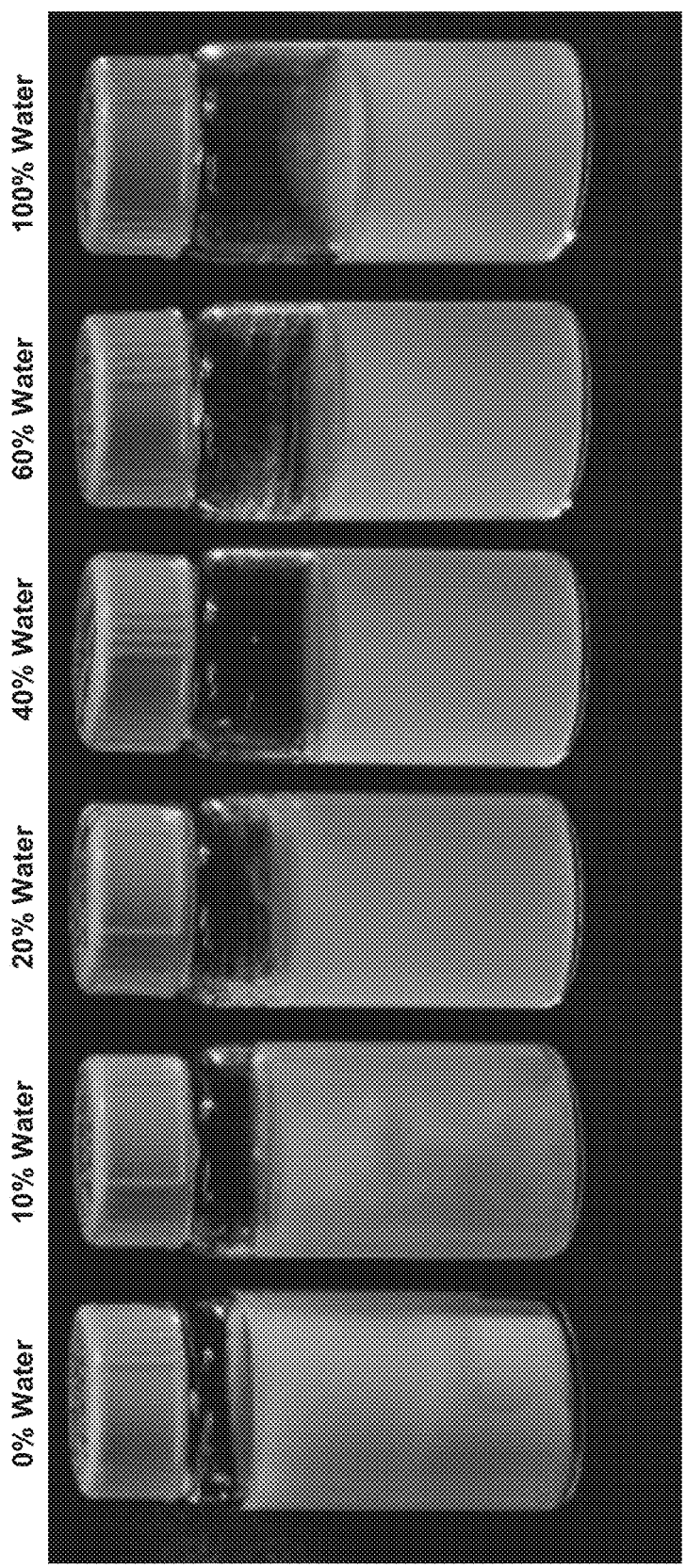
FIG. 16 is a photograph illustrating example vials containing 12% by weight of PEO in solvents with different water:ethanol ratios.

The effect of water:ethanol ratio on solubility of PEO was investigated. FIG. 16 is a photograph illustrating vials containing 12% by weight of PEO in solvents with different water:ethanol ratios. As seen in FIG. 16, the solubility of 1,000,000 Da PEO is affected by the presence of ethanol, with PEO not being fully soluble in solutions with water content less than 20 wt. % by weight. Overall, an example of a suitable ink formulation includes 12 wt. % PEO in the polymer solution, 20 wt. % water in the solvent composition, and 90 wt. % Ag in the dried ink.

Example 5

Figure 17E:
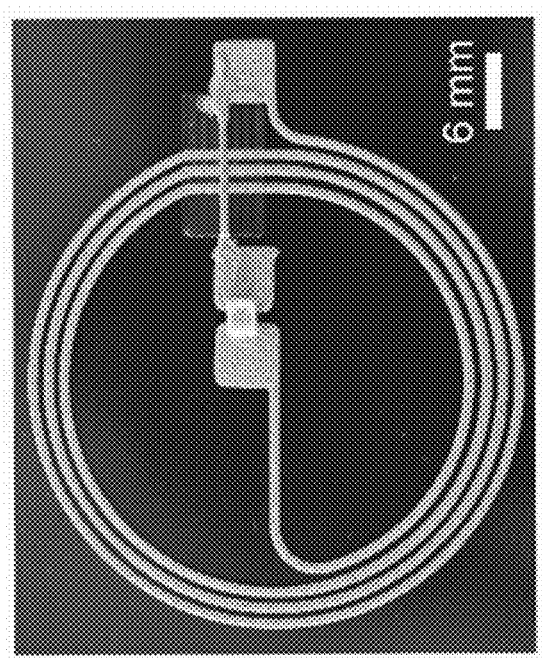
FIG. 17E is a photograph illustrating the final stage of the example wireless device of FIG. 17A.
Figure 17A:
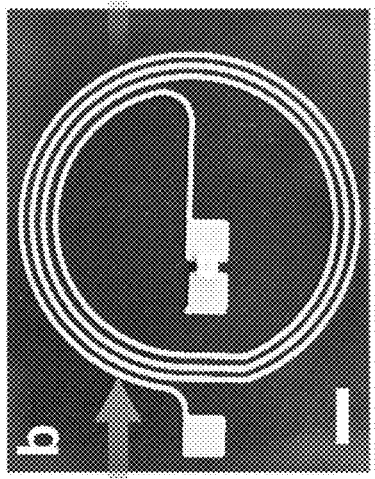
FIG. 17A is a photograph illustrating a first intermediate stage of an example wireless device fabricated by additive manufacturing.
Figure 17B:
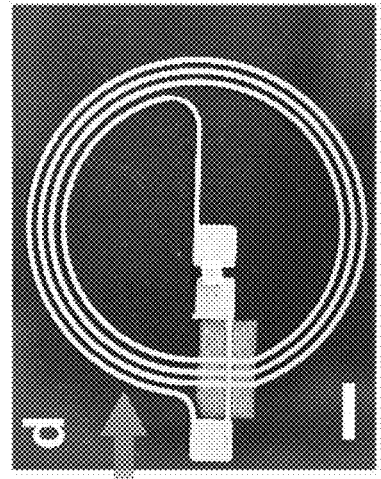
FIG. 17B is a photograph illustrating a second intermediate stage of the example wireless device of FIG. 17A.
Figure 17C:
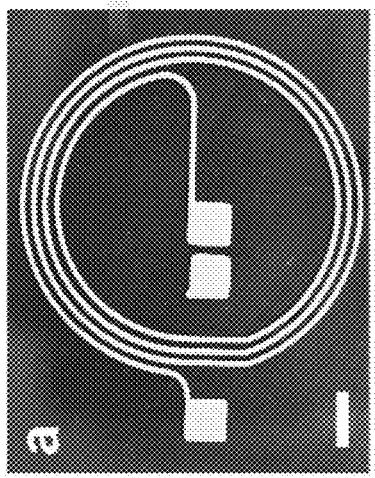
FIG. 17C is a photograph illustrating a third intermediate stage of the example wireless device of FIG. 17A.
Figure 17D:
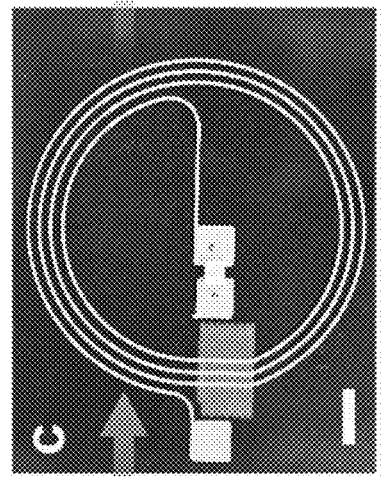
FIG. 17D is a photograph illustrating a fourth intermediate stage of the example wireless device of FIG. 17A.

To demonstrate the performance of the conductive compositions in wireless electronic devices, inductive coils were fabricated to power automatically pick-and-placed light emitting devices (LEDs). FIG. 17A is a photograph illustrating a first intermediate stage of a wireless device fabricated by additive manufacturing. FIG. 17B is a photograph illustrating a second intermediate stage of the wireless device of FIG. 17A. FIG. 17C is a photograph illustrating a third intermediate stage of the wireless device of FIG. 17A. FIG. 17D is a photograph illustrating a fourth intermediate stage of the wireless device of FIG. 17A. FIG. 17E is a photograph illustrating the final stage of the wireless device of FIG. 17A. As seen in FIGS. 17A through 17E, the wireless device was fabricated layer-by-layer, consisting of an inductive coil at the bottom, an insulator layer in the middle, a crossover conductive trace at the top, and a surface-mounted LED as the electrical load of the circuit.

Figure 19:
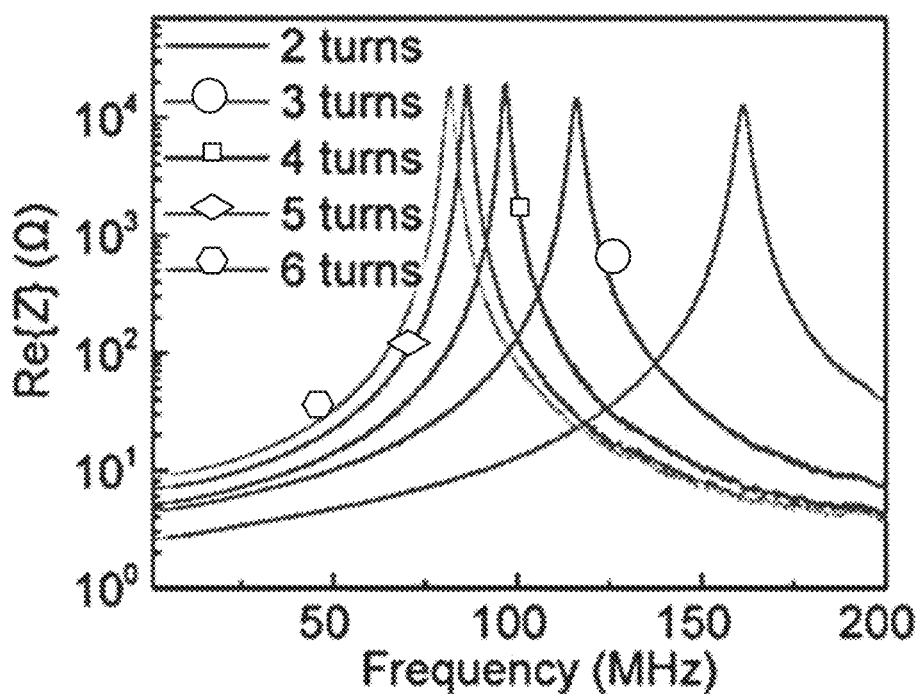
FIG. 19 is a chart illustrating the relationship between impedance response and number of turns of example additively manufactured coils.

Given constraints on the outer diameter and spacing of the inductive coil, electrical characteristics of the circuit were tunable by varying the number of coil turns. Coils including different number of turns were prepared. FIG. 18A is a photograph illustrating an example additively manufactured inductive coil including two turns. FIG. 18B is a photograph illustrating an example additively manufactured inductive coil including three turns. FIG. 18C is a photograph illustrating an example additively manufactured inductive coil including four turns. FIG. 18D is a photograph illustrating an example additively manufactured inductive coil including five turns. FIG. 18E is a photograph illustrating an example additively manufactured inductive coil including six turns. FIG. 19 is a chart illustrating the relationship between impedance response and number of turns of example additively manufactured coils. As seen in FIG. 19, the resonance frequency of the device could be tuned to fall into the operation range of frequency according to the design of a wireless power transmission circuit.

Figure 20A:
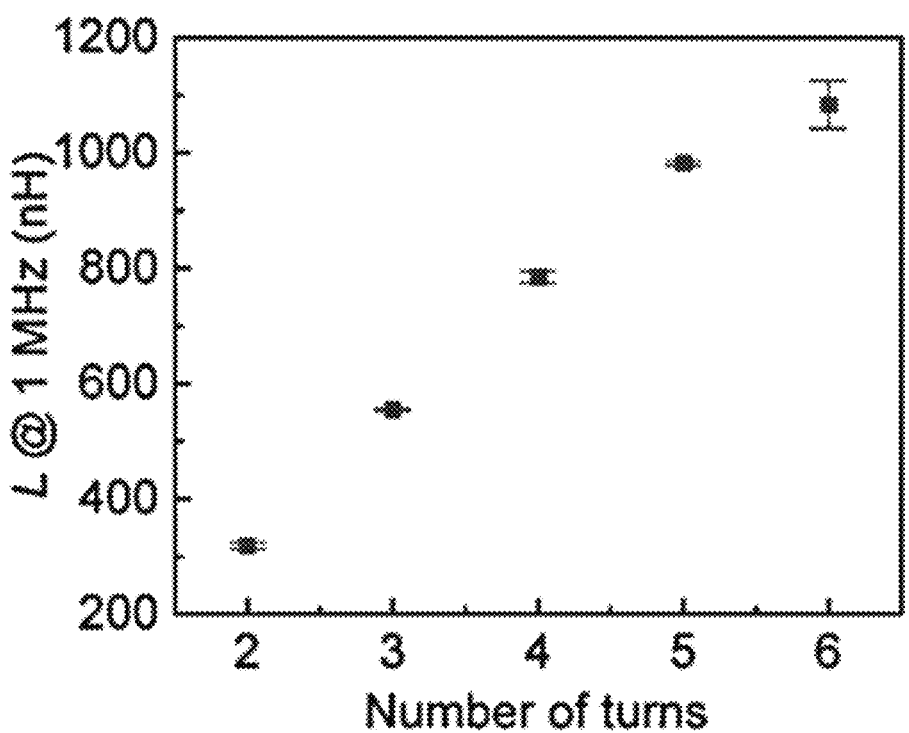
FIG. 20A is a chart illustrating the relationship between impedance and number of turns of example additively manufactured coils.
Figure 20B:
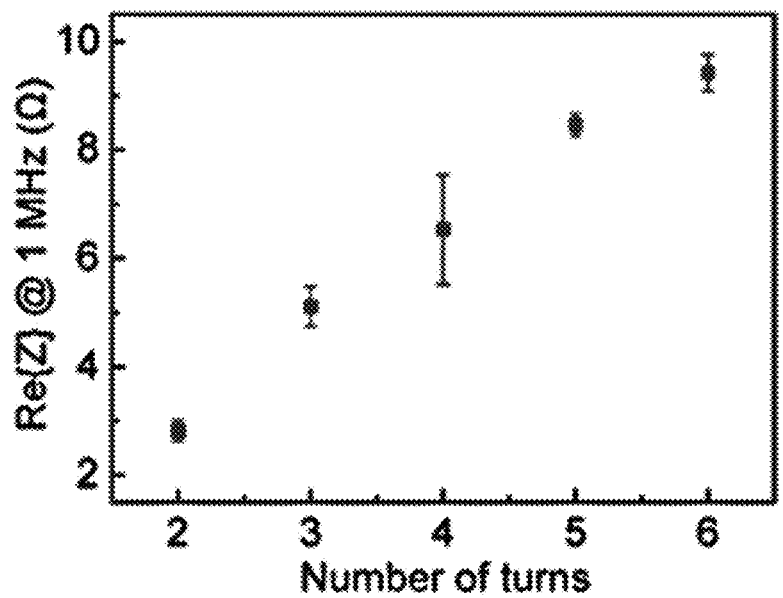
FIG. 20B is a chart illustrating the relationship between real component of impedance and number of turns of example additively manufactured coils.
Figure 20C:
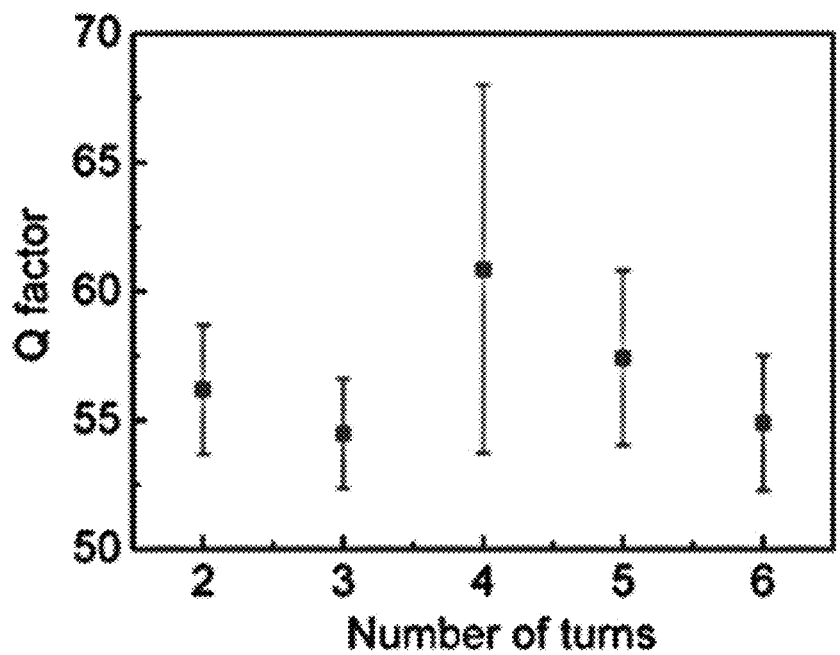
FIG. 20C is a chart illustrating the relationship between Q factor and number of turns of example additively manufactured coils.

FIG. 20A is a chart illustrating the relationship between impedance and number of turns for example additively manufactured coils. As seen in FIG. 20A, an increasing number of coil turns was preferable in terms of higher inductance and thus higher generated electromotive force. FIG. 20B is a chart illustrating the relationship between real component of impedance and number of turns of example additively manufactured coils. While increasing number of turns resulted in higher inductance, as seen in FIG. 20A, the side effect of the increment of impedance resulted in more power loss, as seen in FIG. 20B. FIG. 20C is a chart illustrating the relationship between Q factor and number of turns of example additively manufactured coils. The trade-off between increase in impedance and power loss was reflected in the Q factors of different coil designs, as seen in FIG. 20C.

Example 6

Tracking error of a system for additive manufacturing of a component onto a moving substrate was investigated. An adaptive 3D printing platform was developed. The platform included a delta robot, monitor cameras for long-distance observation of printing states, and tracking cameras mounted on the robot end-effector for precise localization of the target surface. A delta robot (Delta Rostock 3D Printer, Anycubic, Shenzhen, China) was utilized due to its faster travel speed, larger carrying load, more compact size and affordable cost relative to typical gantry-like systems. A computer-vision-based method was chosen for tracking rather than using off-the-shelf depth sensors, in order to achieve customizable tracking precision, resolution and processing speed to match the varying 3D printing scenarios. Visual tracking was enabled by two machine vision cameras (Chameleon3, FLIR, Wilsonville, Oreg.) mounted on the end-effector of the 3D printer. The extrusion of material was controlled by a digital pneumatic regulator (Ultimus V, Nordson EFD, Westlake, Ohio) that was connected to a syringe (Optimum, Nordson EFD Westlake, Ohio) mounted on the end-effector of the 3D printer.

An empty syringe with a 610 µm nozzle (EFD) was used for the pick-and-place of the LED (Low Current SMD LED, Vishay, Shelton, Conn.). During printing, 250 µm nozzles (EFD) and syringes filled with conductive ink or insulating ink (SI 595, Loctite, Westlake, Ohio) were utilized. A custom-programmed software framework was developed in Python, with functions including generation of conformal toolpath, image processing, pose estimation of the target surface, and generation of G-code commands. Toolpath resolution was set to be 0.2 mm.

The target surface was scanned by a structured light scanner (HDI 109, LMI Technologies, Canada). The raw scan data was post-processed by a geometry editing software (DAVID 3, Hewlett Packard, Palo Alto, Calif.) to yield a uniform, smooth mesh.

The spatial fidelity of the printed structure on a moving surface depended on three system specifications: (1) diameter of the extrusion nozzle; (2) image resolution and processing errors in the visual tracking system; (3) resolution and accuracy of the 3D printer. Since the dimension of the extrusion nozzle is submillimeter, the latter two specifications become dominant in determining the resolution limits in this current setup. To characterize the tracking performance, the printer nozzle was commanded to track a given trajectory on a linear stage with programmed reciprocating motion, which was "unknown" to the adaptive printing platform.

Figure 21:
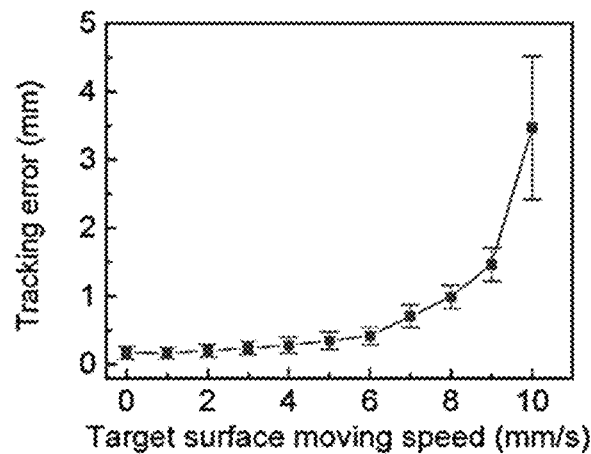
FIG. 21 is a chart illustrating tracking error of an example adaptive printing system as a function of moving speed of a target surface (n=2000), with a printer moving speed of 14 mm/s.
Figure 22:
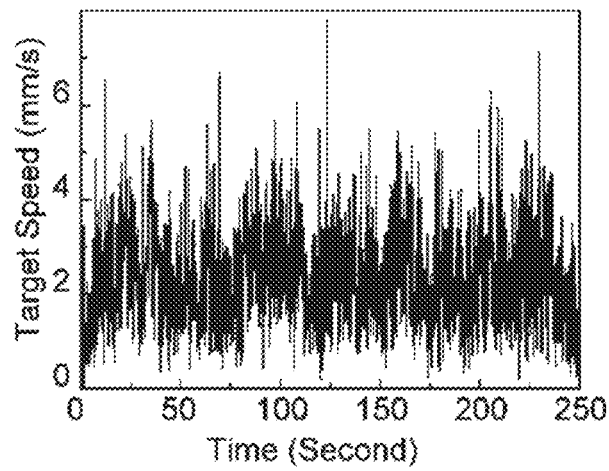
FIG. 22 is a chart illustrating instantaneous speed of a example target substrate captured by a example tracking system.

FIG. 21 is a chart illustrating tracking error of an example adaptive printing system as a function of moving speed of a target surface (n=2000), with a printer moving speed of 14 mm/s. FIG. 22 is a chart illustrating instantaneous speed of an example target substrate captured by a tracking system. As seen in FIG. 21, the tracking error could be controlled to be under 1.5 mm on target surfaces exhibiting slow motion (<8 mm/s), referring to the speed profile of the arbitrary hand motion captured by the visual tracking system (FIG. 22).

Figure 23:
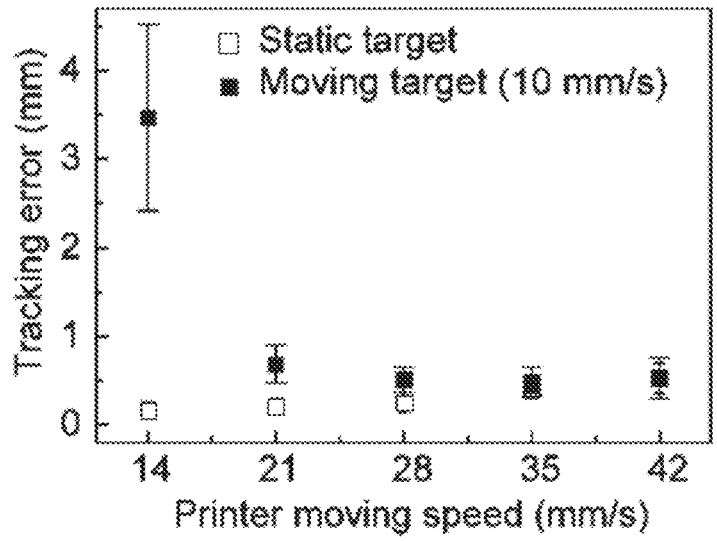
FIG. 23 is a chart illustrating tracking error for example static and moving target substrates at different printer movement speeds.

FIG. 23 is a chart illustrating tracking error for example static and moving target substrates at different printer movement speeds. By further increasing the moving speed of the printer, the tracking error could maintain the same accuracy for target surfaces with faster motion (10 mm/s), though sacrificing the tracking stability of static targets as seen in FIG. 23. To increase printing accuracy, the moving speed of the printer may be parametrized based on prior knowledge of the speed range of the target surface.

Example 7

Direct fabrication of wirelessly powered electronic devices onto an unconstrained human hand was investigated. A surface-mounted light emitting diode (LED) was automatically pick-and-placed onto a target surface on a hand via an empty nozzle under controlled vacuum levels. Since there are not abundant visual features on a human hand suitable for computer-vision-based tracking, registration features were used.

Figure 24A:
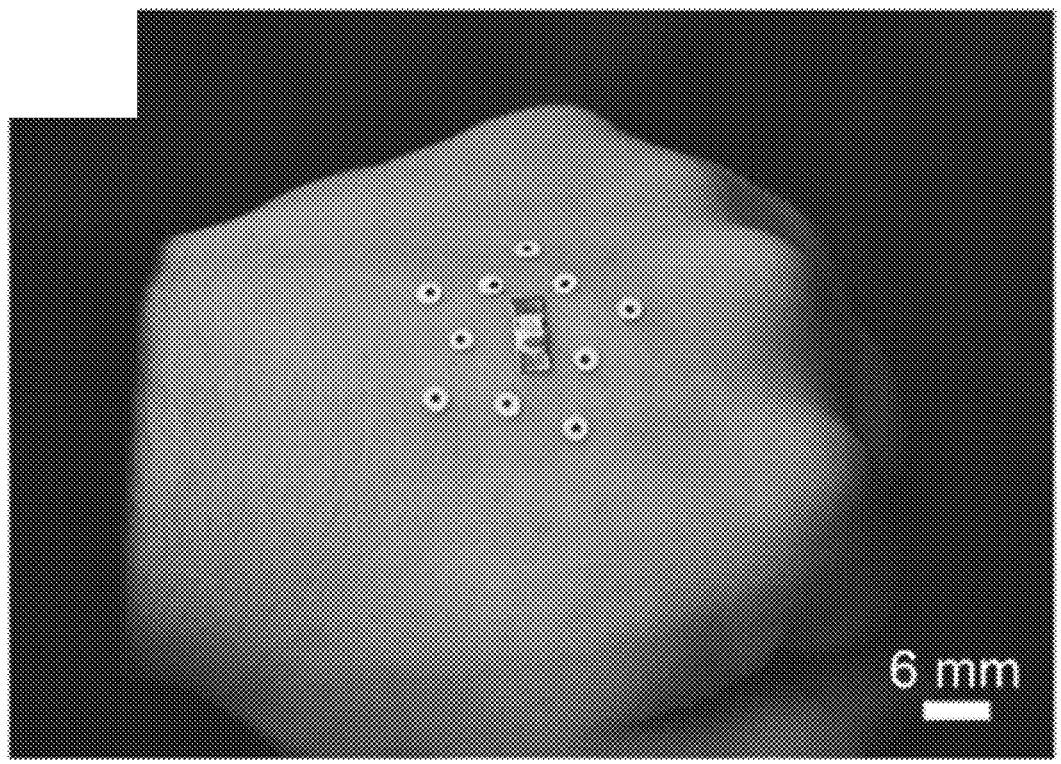
FIG. 24A is a photograph illustrating an example of a plurality of registration features disposed about a light emitting diode (LED) on a hand.

FIG. 24A is a photograph illustrating an example plurality of registration features disposed about a light emitting diode (LED) on a hand. As seen in FIG. 24A, registration features were attached before printing for robust feature detection.

Figure 24B:
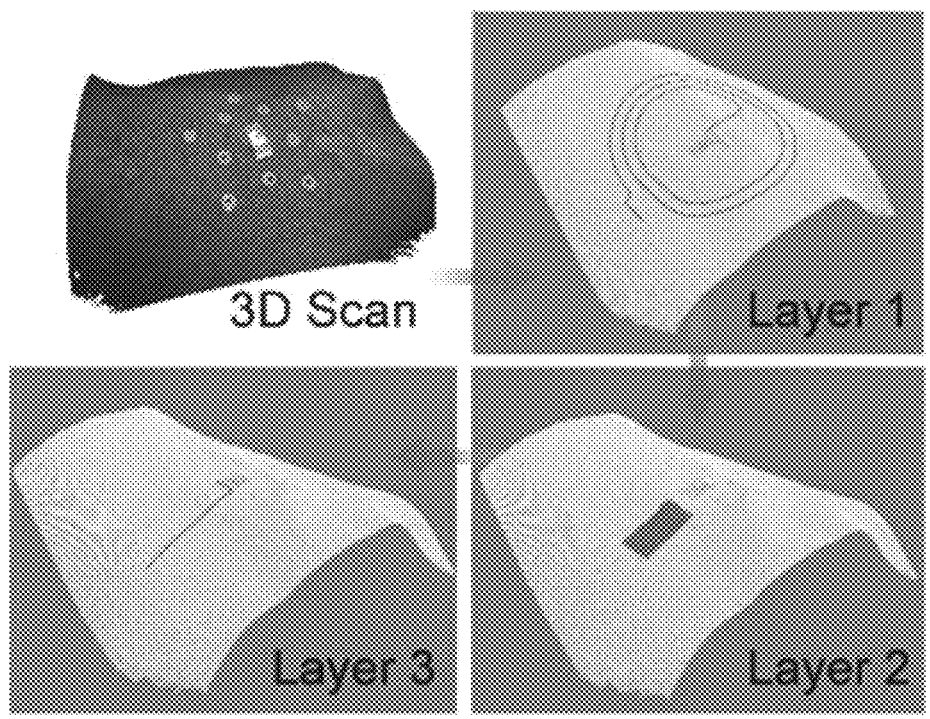
FIG. 24B is a photograph illustrating an example scanned image of the hand of FIG. 24A and layers of an example device to be additively manufactured on the hand.
Figure 24C:
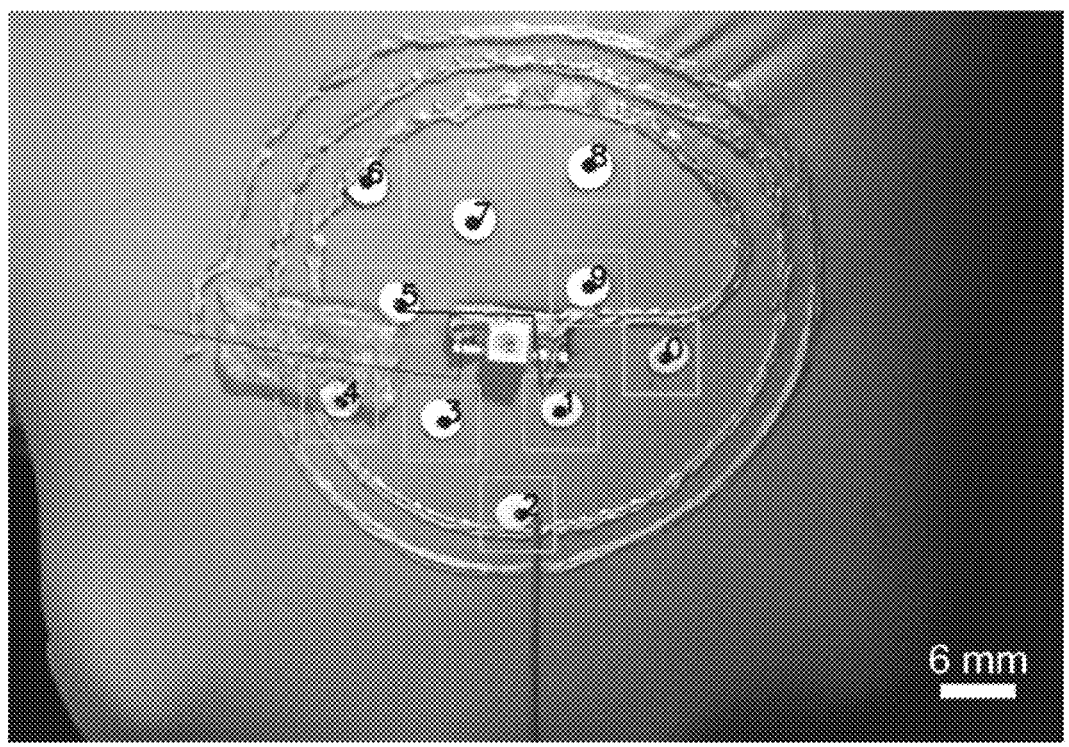
FIG. 24C is a photograph illustrating an example tracking image captured by an example tracking device showing real time detection of the registration features.

To compute the geometrically adaptive toolpath for each layer of the device and also register the spatial information of the LED and the registration features, the hand was 3D scanned into a dense point cloud with a structured light scanner. FIG. 24B is a photograph illustrating an example scanned image (point cloud) of the hand of FIG. 24A and layers of a device to be additively manufactured on the hand. FIG. 24C is a photograph illustrating an example tracking image captured by a tracking device showing real time detection of the registration features.

Figure 24D:
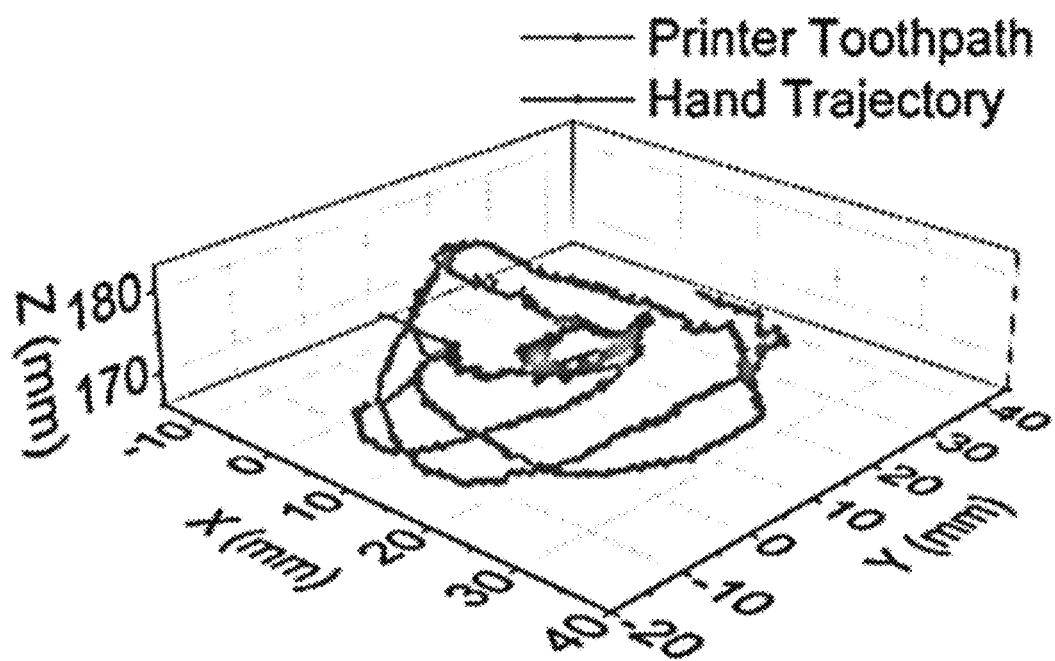
FIG. 24D is a chart illustrating the trajectory of an example randomly moving hand and an adaptive toolpath, both computed in real-time by a visual tracking system.

During printing, the 3D position and orientation of the hand were estimated via a perspective-n-point (PnP) method based on the positions of the registration features detected by the tracking cameras (FIG. 24C), with an average refresh rate of 20 Hz. FIG. 24D is a chart illustrating the trajectory of an example randomly moving hand and an adaptive toolpath, both computed in real-time by a visual tracking system. The pose information of the hand was then fed back to the printer controller in real time to compute the toolpath to be followed by the end-effector, which was adaptive to both the geometry and the motion of the human hand (FIG. 24D).

Figure 24E:
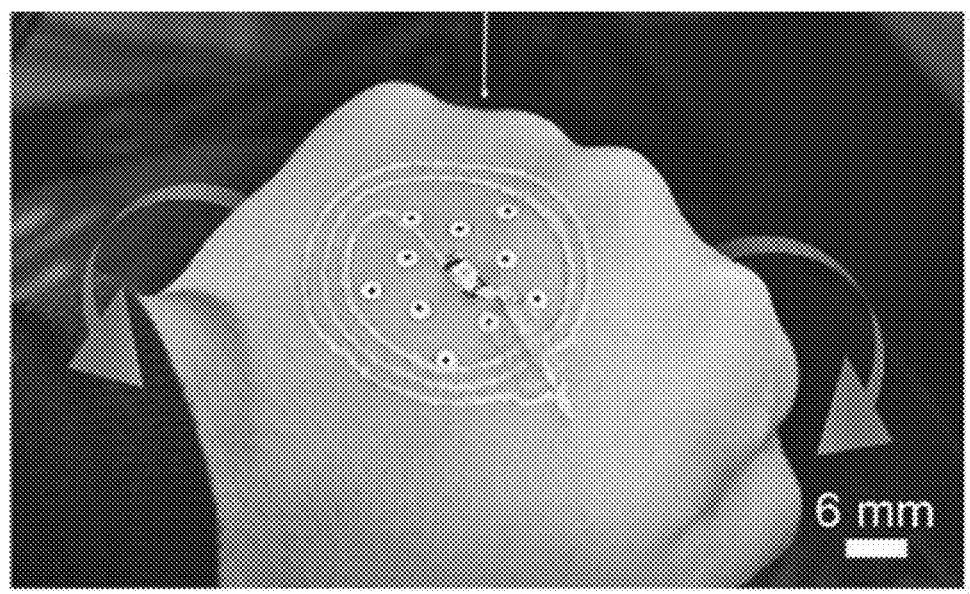
FIG. 24E is an example photograph illustrating the device of FIG. 24B additively manufactured on the hand of FIG. 24A.

The hand was unconstrained during printing and could move and rotate randomly within the range of the 3D printing workspace (φ230×270 mm), with a linear speed below 8 mm/s, so that the motion-induced printing errors were tolerable for device functionality. FIG. 24E is a photograph illustrating the device of FIG. 24B additively manufactured on the hand of FIG. 24A.

Figure 24F:
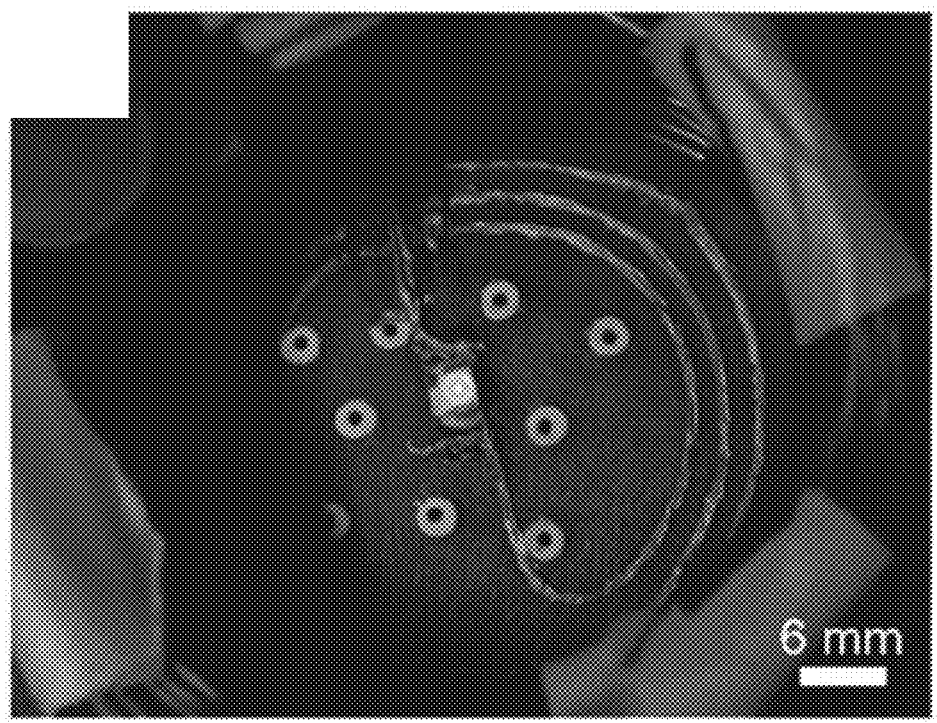
FIG. 24F is an example photograph illustrating the device of FIG. 24E powering up the LED by power wirelessly transmitted to the device by a transmission system.

After drying under room temperature for 15 min, the functionality of the 3D printed wireless device was demonstrated by lighting the LED with a wireless power transmission coil. FIG. 24F is a photograph illustrating the device of FIG. 24E powering up the LED by power wirelessly transmitted to the device by a transmission system.

The interfacial bonding between the skin and ink was sufficient to support the printed form of the devices on the hand for more than two hours without detachment. It was observed that the pulling force required to overcome the adhesion of the device resulted in deformation of the detached trace. However, the devices could be simply removed without destructive deformation by peeling them off the skin with a tweezer. The relatively high molecular weight of PEO in the conductive ink helped maintain a continuous trace during the peel-off process. If devices need to be removed for the purpose of recycling the surface onto which they are printed, such as the surfaces of rubber gloves or clothes, it was found that the printed devices could be degraded by first dissolving the PEO in water and then physically removing the remaining detached silver particles.

Example 8

Figure 25A:
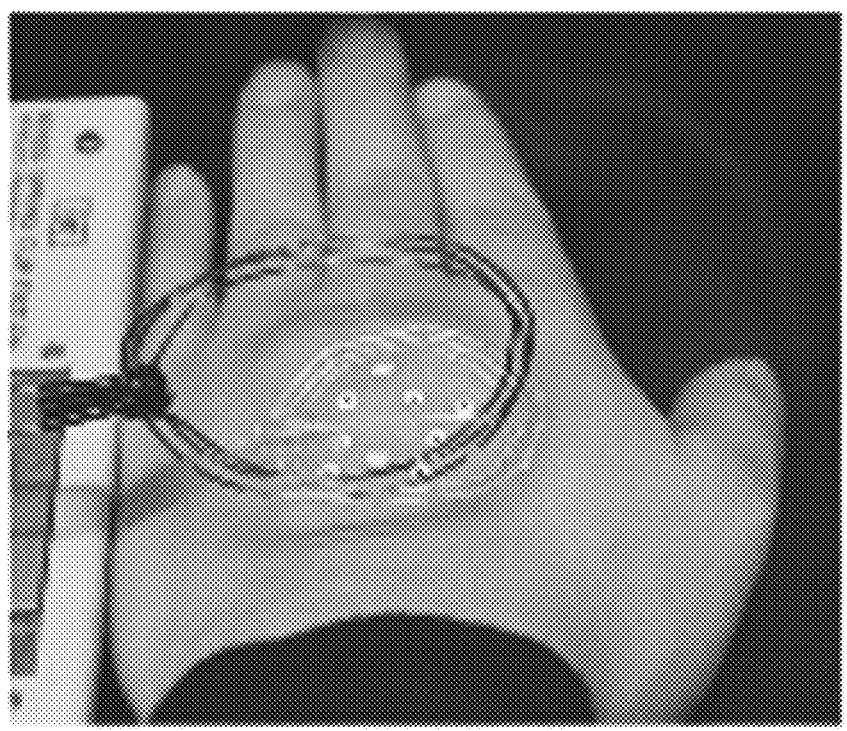
FIG. 25A is a photograph illustrating an example readout coil sensing a change in impedance of the additively manufactured device of FIG. 24E in response to change in moisture at the surface of the hand.

The use of additively manufactured inductive coils as a wireless moisture sensor was investigated. When immersed into water, the printed conductive traces underwent a reverse process of drying, thus exhibiting higher impedance. FIG. 25A is a photograph illustrating an example readout coil sensing a change in impedance of the additively manufactured device of FIG. 24E in response to change in moisture at the surface of the hand.

Figure 25B:
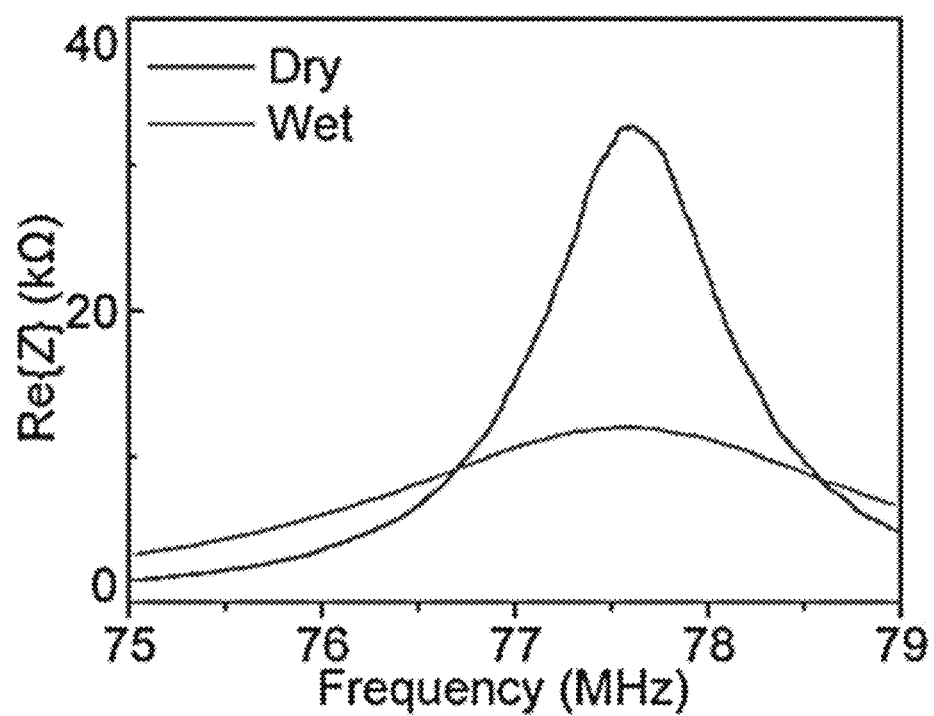
FIG. 25B is an example chart comparing the impedance responses of the additively manufactured coil in dry and wet states.

FIG. 25B is a chart comparing the impedance responses of the example additively manufactured coil in dry and wet states. When the 3D printed wireless moisture sensor was placed under the readout coil with the skin on the back of the hand in dry and wet states, distinguishable frequency responses from the readout coil were observed, as seen in FIG. 25B.

Under controlled moisturization, the ink was observed to maintain the printed form, and recovering to the initial impedance level after drying, with an error of 3.9±14.1% (n=3). The change of impedance in the inductive coil was reflected in the shift of frequency response from a readout system that was inductively coupled with the coils. Different moisture states of the conductive traces were imparted by applying water vapor with a constant flow rate to the wireless sensor for different periods of time.

Figure 25C:
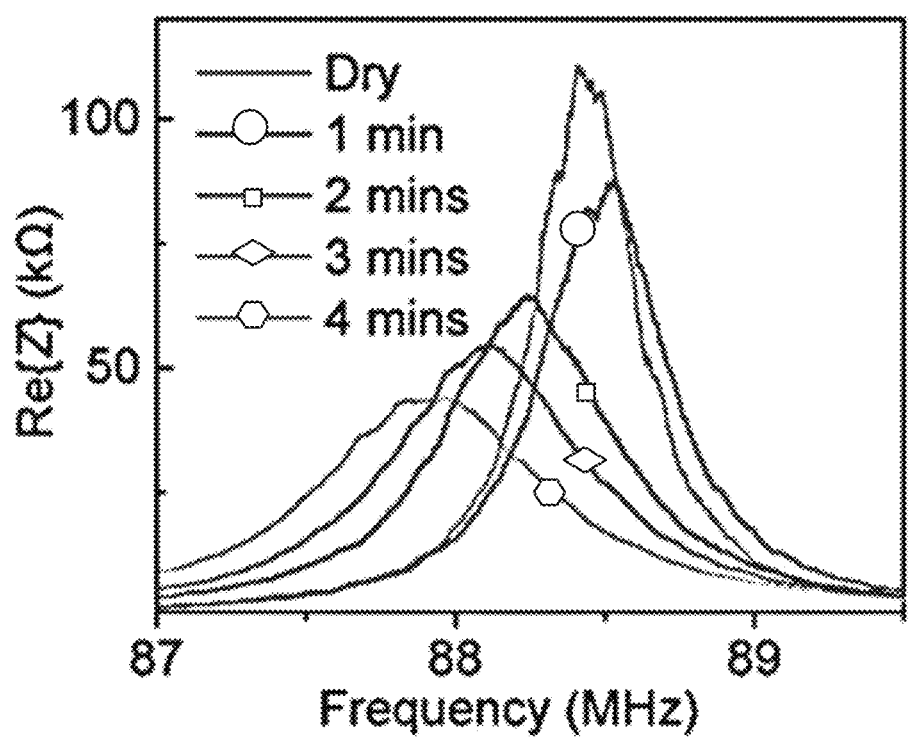
FIG. 25C is a chart illustrating impedance response of an example additively manufactured coil exposed to moisture for different periods of time.

FIG. 25C is a chart illustrating impedance response of an example additively manufactured coil exposed to moisture for different periods of time. The change of resonance frequency and impedance responses from the readout coil indicated different moisture states of the conductive traces (FIG. 25C). The reusability of the wireless sensor was studied by repeatedly moisturizing the device and letting it dry (n=4). The moisturized conductive trace recovered to a conductivity level that was close to the original dry state.

Example 9

Biological applications of the adaptive 3D printing process were investigated by additively depositing material (cells) on moving targets (mice). Recessive dystrophic epidermolysis bullosa (RDEB) is a genetic disease which results in life-altering blisters and open wounds. Advances have been made through genetic correction of the mutation causing the disease, but an appropriate in vivo delivery system for the gene-edited cells has yet to be found. Adaptive 3D printing was investigated for delivery of cells.

Figure 26A:
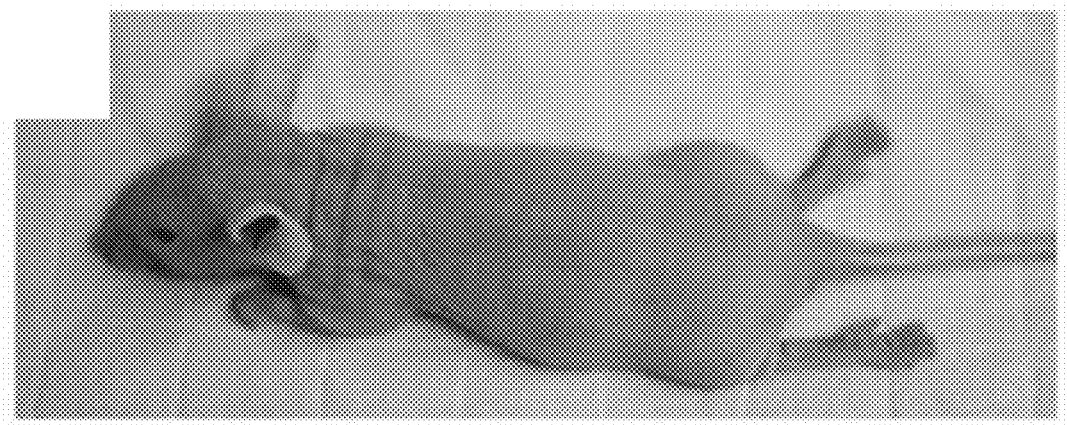
FIG. 26A is a photograph of a mouse.
Figure 26B:
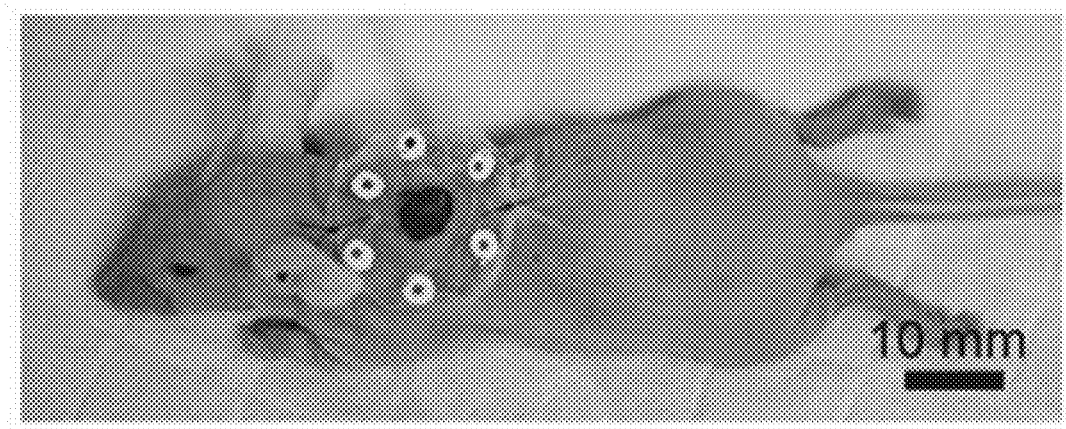
FIG. 26B is a photograph illustrating the mouse of FIG. 26A with registration features and an induced wound.
Figure 26C:
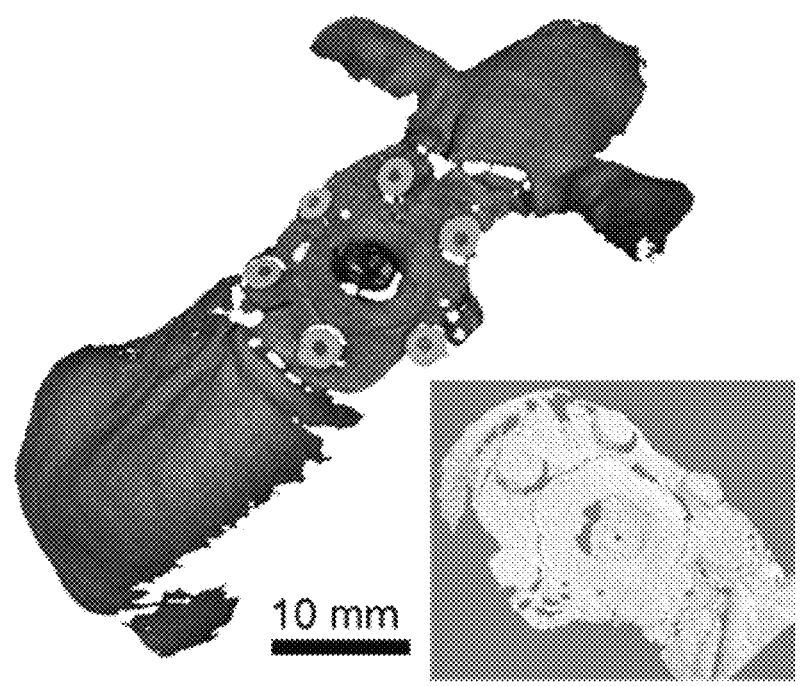
FIG. 26C is a photograph illustrating a scanned image of the mouse of FIG. 26B, with an inset showing a magnified view of the scanned wound.

FIG. 26A is a photograph of a mouse. FIG. 26B is a photograph illustrating the mouse of FIG. 26A with registration features and an induced wound. Before adaptively printing cell-laden hydrogels into the wound bed of live mice, preparation procedures including attaching registration features, as shown in FIG. 26B. The mouse was 3D scanned. FIG. 26C is a photograph illustrating a scanned image of the mouse of FIG. 26B, with an inset showing a magnified view of the scanned wound.

The mouse was sedated before printing but still underwent motions such as breathing and twitching, which was compensated by the adaptive printing system. Superficial wounds were created on 4-6 week-old Crl:NU(NCr)-Foxn1nu mice (Charles River, 490). A squamous cell carcinoma (SCC) GFP/Luc line was mixed with a bio-ink and printed onto the wounded mice with the adaptive printing platform. The solvent for the bio-ink was prepared by mixing phosphate buffered saline (PBS, Gibco, Waltham, Mass.) and glycerol (Fisher Chemical, Pittsburgh, Pa.) at a volume ratio of 4:1. Gelatin methacrylate (GelMa, BioBots, Philadelphia, Pa.) and lithium phenyl-2,4,6-trimethylbenzoylphosphinate (LAP) (Biokey, BioBots, Philadelphia, Pa.) were added to the solvent at concentrations of 0.15 g/mL and 0.006 g/mL, respectively, to form the final bio-ink. The ink was stored in a dry oven at 37° C. overnight to allow the GelMa to dissolve. The SCC line was printed into the wound bed at a concentration of $10^6$ cells/mL in the bio-ink and then UV cured (λ=395 nm). Prior to imaging, mice were anesthetized by isoflurane inhalation and received a topical application of 30 mg/ml luciferin substrate directly to the wound bed.

Figure 26D:
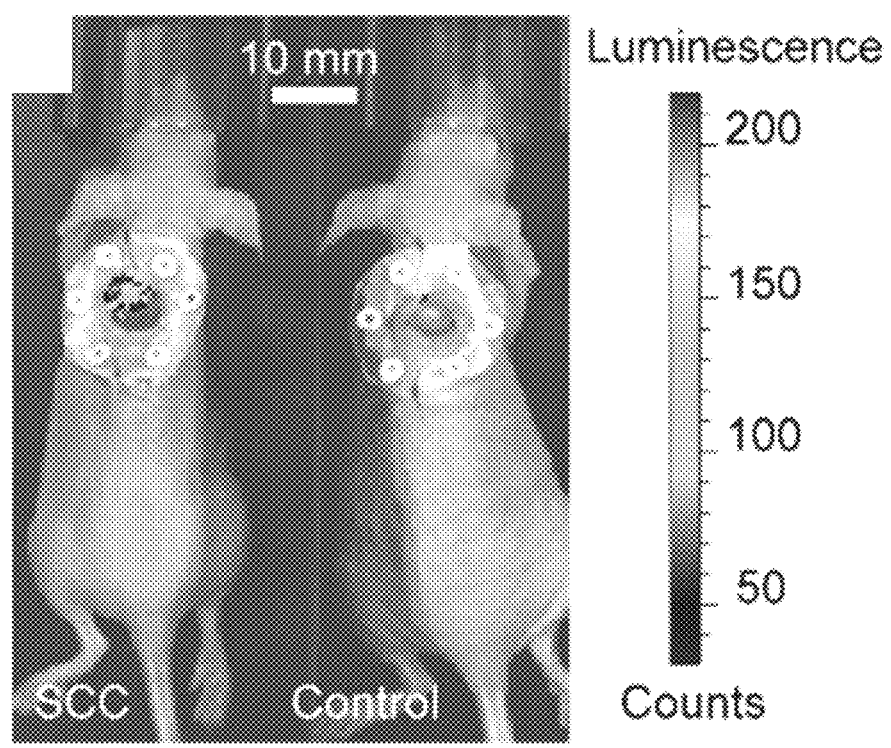
FIG. 26D is a photograph illustrating a bioluminescent image of the mouse of FIG. 26B (left) and of a mouse of a control group (right).

FIG. 26D is a photograph illustrating a bioluminescent image of the mouse of FIG. 26B (left) and of a mouse of a control group (right). The presence of viable cells was detected via bioluminescence imaging following 4 hours of printing (FIG. 26D), showing the potential of the adaptive printing method to retain the functionality of the cell-laden compositions.

Example 10

Figure 27A:
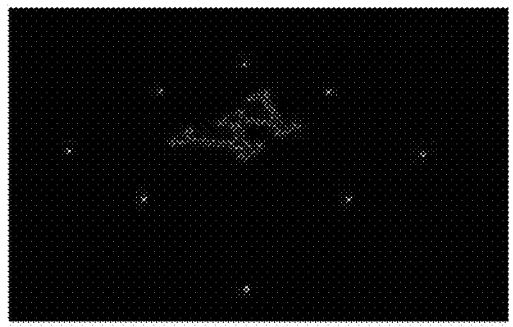
FIG. 27A is a photograph illustrating an example computational model of a deformable surface at a first time.
Figure 27B:
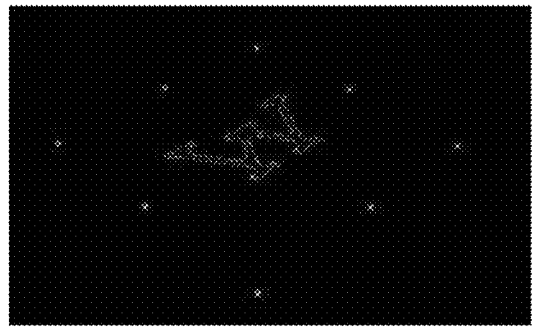
FIG. 27B is a photograph illustrating an example computational model of a deformable surface at a second time.
Figure 28:
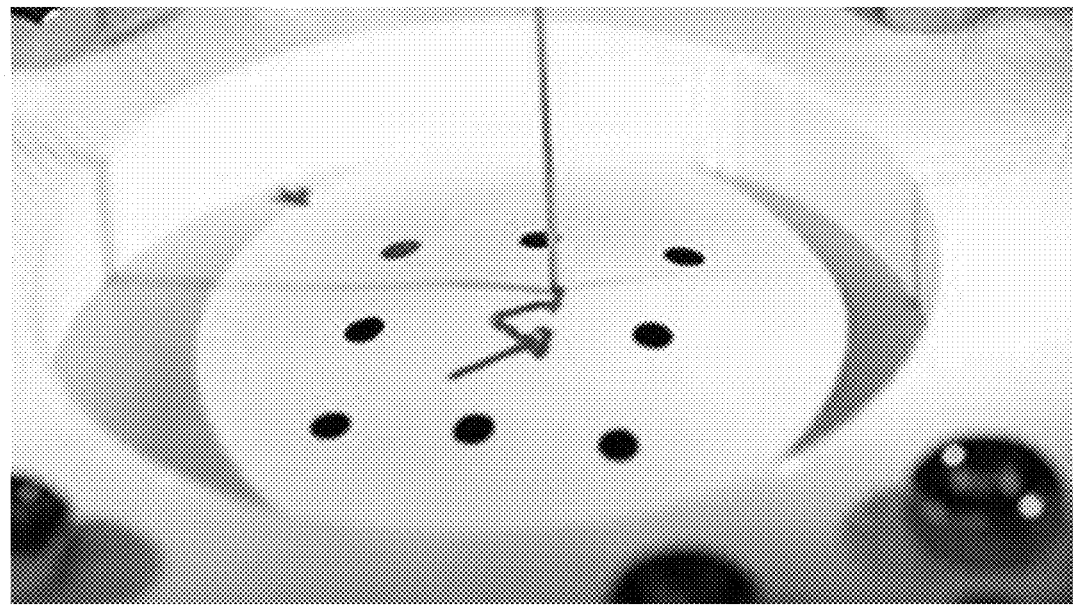
FIG. 28 is a photograph illustrating additive deposition of an example composition on a deformable surface.

Additive deposition was performed on a deformable surface. A plain 55 Neoprene (McMaster-Carr (Elmhurst, Ill.) rubber surface was pneumatically deformed. Registration features were on the surface before printing. 3D point clouds of different deformation primitives/modes of the build surface were generated by a 3D scanner. FIG. 27A is a photograph illustrating an example computational model of a deformable surface at a first time. FIG. 27B is a photograph illustrating an example computational model of a deformable surface at a second time. A continuous computational model describing the deformation of the build surface was generated by a controller based on the 3D point cloud data (FIGS. 27A and 27B). The controller computed 3D positions of each registration feature, and feeds them as input to the previously generated computational model of deformation, to generate the deformed 3D trajectory as output. FIG. 28 is a photograph illustrating additive deposition of an example composition on a deformable surface. A silicone composition (Room-Temperature-Vulcanizing silicone, Permatex, Hartford, Conn.) was deposited on the rubber surface (FIG. 28) based on a predetermined model (shown in FIGS. 27A and 28B).

Various examples have been described. These and other examples are within the scope of the following claims.

What is claimed is:

1. A system for additively manufacturing a component on an unconstrained freeform build surface, the system comprising:
    at least one dispenser directable towards the unconstrained freeform build surface;
    at least one sensor configured to sense at least one registration feature on the unconstrained freeform build surface;
    at least one material repository configured to hold at least one composition, wherein the at least one material repository is fluidically connected to the at least one dispenser; and a controller, wherein the controller comprises:
  a data storage module configured to store a build model of the component, and control circuitry configured to:
    generate, based on first sensor data received from the at least one sensor, a point cloud model of the unconstrained freeform build surface,
    monitor the at least one registration feature during dispensing of the at least one composition by continuously or periodically receiving second sensor data from the at least one sensor,
    determine, based on the second sensor data, a relative location of the at least one registration feature on the unconstrained freeform build surface to the at least one dispenser over time,
    determine, based at least on the relative location of the at least one registration feature and the point cloud model, a three-dimensional (3D) trajectory and/or deformation of a target deposition region on the unconstrained freeform build surface,
    determine, based on the 3D trajectory and/or deformation of the target deposition region, a prediction of future 3D trajectory and/or deformation of the build surface, wherein the future 3D trajectory and/or deformation of the build surface is based on future changes in a three-dimensional (3D) position and orientation of the build surface relative to the at least one dispenser, and
    send, based on: (1) the 3D trajectory and/or deformation, (2) the prediction of future 3D trajectory and/or deformation, and (3) the build model, one or more control signals to the at least one dispenser to cause the dispensing of the at least one composition from the at least one dispenser in a predetermined pattern on or adjacent to the target deposition region, wherein the predetermined pattern of the composition defines at least one portion of the component,
  wherein movement and/or deformation of the unconstrained freeform build surface is independent of control of the system.

2. The system of claim 1, wherein the at least one sensor comprises:
  at least one dense 3D sensor configured to capture 3D geometry of the unconstrained freeform build surface; and
  at least one sparse 3D sensor configured to sense the at least one registration feature.

3. The system of claim 2,
  wherein the data storage module is further configured to store a predetermined tool path for the at least one dispenser;
  wherein the predetermined toolpath is associated with the component;
  wherein the first sensor data comprises dense sensor data received from the at least one dense 3D sensor; and
  wherein the control circuitry is configured to generate the point cloud model of the unconstrained freeform build surface generate based on the dense sensor data.

4. The system of claim 3, wherein the point cloud model comprises a parameter varying point cloud model of a deformable, unconstrained freeform build surface.

5. The system of claim 3, wherein the control circuitry is configured to:
  determine, based on the point cloud model, the predetermined toolpath, and a predetermined criterion for space filling, a modified tool path; and
  send the one or more control signals to the at least one dispenser based on the modified tool path.

6. The system of claim 3,
  wherein the second sensor data comprises sparse sensor data received from the at least one sparse 3D sensor, and
  wherein, to determine the 3D trajectory and/or deformation of the target deposition region, the control circuitry is configured to:
    determine, based on the sparse sensor data and the point cloud model, a correspondence between the at least one registration feature and the point cloud model;
    determine, based on the sparse sensor data, the relative location of the at least one registration feature to the dispenser over time; and
    determine, based on the relative location of the at last one registration feature to the at least one dispenser over time, the correspondence between the at least one registration feature and the point cloud model, and the point cloud model, the 3D position and orientation of the unconstrained freeform build surface relative to the at least one dispenser.

7. The system of claim 6, wherein the control circuitry is configured to:
  determine, based on the predetermined toolpath and the 3D position and orientation of the unconstrained freeform build surface, an adapted toolpath; and
  send the one or more control signals to the at least one dispenser based on the adapted tool path.

8. The system of claim 7, wherein the control circuitry is configured to:
  determine, based on the relative location of the at least one registration feature to the at least one dispenser over time and the 3D position and orientation of the unconstrained freeform build surface relative to the at least one dispenser, the prediction of future changes in the 3D position and orientation of the build surface; and
  send the one or more control signals to the at least one dispenser based on the adapted tool path and the prediction of the future changes in 3D position and orientation of the build surface.

9. The system of claim 3,
  wherein the predetermined tool path comprises at least one sequence of waypoints to be followed by the at least one dispenser in chronological order, and
  wherein each waypoint defines a corresponding position of the at least one dispenser, a corresponding velocity of the at least one dispenser, and a corresponding acceleration of the at least one dispenser, a corresponding orientation of the at least one dispenser, corresponding dispensing parameters of the at least one dispenser.

10. The system of claim 2, wherein the at least one dense 3D sensor comprises at least one depth sensor or 3D scanner configured to sense dense 3D sensor information based on a triangulation-based method, a time-of-flight method, or an optical coherence tomography method.

11. The system of claim 2, wherein the at least one sparse 3D sensor comprises at least one of:
  an optical sensor;
  a thermal sensor;
  an electric sensor;
  a biological sensor.

12. The system of claim 2, wherein the at least one sparse 3D sensor comprises a quality inspection device configured to image at least one of:

an as-deposited pattern of the composition deposited by the at least one dispenser; or a state of the at least one dispenser.

13. The system of claim 1, wherein the at least one registration feature comprises at least one of a label, a sticker, a decal, a retroreflective feature, a 2D geometric feature of the build surface, a 3D geometric feature of the build surface, a thermal feature of the surface, an electrical feature of the surface, a biological feature of the surface, or a temporary tattoo.

14. The system of claim 1, wherein the at least one registration feature comprises a plurality of registration features disposed in a predetermined pattern on the unconstrained freeform build surface.

15. The system of claim 1,
wherein the unconstrained freeform build surface comprises a deformable, unconstrained freeform build surface, and
wherein the 3D trajectory and/or deformation of the target deposition region on the unconstrained freeform build surface accounts for deformation of the deformable, unconstrained freeform build surface.

16. The system of claim 1,
wherein the component includes at least one of an electronic material, an electronic component, or an electronic device, and
wherein the unconstrained freeform build surface comprises a biological tissue.

17. A method for additively manufacturing a component on an unconstrained freeform build surface, the method comprising:
generating, by control circuitry, based on first sensor data received from at least one sensor, a point cloud model of the unconstrained freeform build surface, wherein the at least one sensor is configured to sense at least one registration feature on the unconstrained freeform build surface;
monitoring, by the control circuitry, the at least one registration feature during dispensing of the at least one composition by continuously or periodically receiving second sensor data from the at least one sensor;
determining, by the control circuitry, based on the second sensor data, a relative location of the at least one registration feature on the unconstrained freeform build surface to at least one dispenser over time;
determining, by the control circuitry, based at least on the relative location of the at least one registration feature and the point cloud model, a three-dimensional (3D) trajectory and/or deformation of a target deposition region on the unconstrained freeform build surface;
determining, by the control circuitry, based on the 3D trajectory and/or deformation of the target deposition region, a prediction of future 3D trajectory and/or deformation of the build surface, wherein the future 3D trajectory and/or deformation of the build surface is based on future changes in a three-dimensional (3D) position and orientation of the build surface relative to the at least one dispenser; and
sending, by the control circuitry, and based on: (1) the 3D trajectory and/or deformation, (2) the prediction of future 3D trajectory and/or deformation, and (3) the build model, one or more control signals to the at least one dispenser to cause the dispensing of the at least one composition from the at least one dispenser in a predetermined pattern on or adjacent to the target deposition region, wherein the predetermined pattern of the composition defines at least one portion of the component, wherein the at least one dispenser is directable towards the unconstrained freeform build surface, and wherein the at least one material repository is fluidically connected to the at least one dispenser and configured to hold the at least one composition, wherein movement and/or deformation of the unconstrained freeform build surface is independent of control of the control circuitry.

18. The method of claim 17,
wherein the at least one sensor comprises:
at least one dense 3D sensor configured to capture 3D geometry of the unconstrained freeform build surface; and
at least one sparse 3D sensor configured to sense the at least one registration feature;
wherein the first sensor data comprises dense sensor data received from at least one dense 3D sensor,
wherein the second sensor data comprises sparse sensor data received from the at least one sparse 3D sensor;
wherein the data storage module is further configured to store a predetermined tool path for the at least one dispenser;
wherein the predetermined toolpath is associated with the component; and
wherein generating the point cloud model of the unconstrained freeform build surface comprises generating the point cloud model of the unconstrained freeform build surface based on the dense sensor data.

19. The method of claim 18, further comprising:
determining, by the control circuitry, a modified toolpath based on the point cloud model, the predetermined tool path, and a predetermined criterion for space filling; and
wherein sending the one or more control signals to the at least one dispenser comprises sending the one or more control signals controlling the dispenser based on the modified toolpath.

20. The method of claim 18, wherein:
wherein determining the 3D trajectory and/or deformation of the target deposition region comprises:
determining, by the control circuitry, based on the sparse sensor data and the point cloud model, a correspondence between the at least one registration feature and the point cloud model;
determining, by the control circuitry, based on the sparse sensor data, the relative location of the at least one registration feature relative to the dispenser over time; and
determining, by the control circuitry, the 3D position and orientation of the unconstrained freeform build surface relative to the dispenser based on the location of the at last one registration feature relative to the dispenser over time, the correspondence between the at least one registration feature and the point cloud model, and the point cloud model; and
wherein the method further comprises:
determining, by the control circuitry, based on the predetermined toolpath and the 3D position and orientation of the unconstrained freeform build surface, an adapted tool path; and
sending, by the control circuitry, the one or more control signals to the at least one dispenser based on the adapted tool path.

21. The method of claim 20, further comprising:
determining, by the control circuitry, based on the relative location of the at least one registration feature to the at least one dispenser over time and the 3D position and orientation of the unconstrained freeform build surface relative to the dispenser, the prediction of the future changes in 3D position and orientation of the build surface; and sending the one or more control signals to the at least one dispenser based on the adapted toolpath and the prediction of the future changes in 3D position and orientation of the build surface.

\* \* \* \* \*

UNITED STATES PATENT AND TRADEMARK OFFICE
CERTIFICATE OF CORRECTION

PATENT NO. : 11,794,413 B2
APPLICATION NO. : 16/460194
DATED : October 24, 2023
INVENTOR(S) : Michael C. McAlpine and Zhijie Zhu Page 1 of 1

It is certified that error appears in the above-identified patent and that said Letters Patent is hereby corrected as shown below:

In the Claims

Column 30, Lines 38-39 (Claim 20): Replace "wherein: wherein determining" with -- wherein: determining --.

Signed and Sealed this
Thirteenth Day of May, 2025

Coke Morgan Stewart
*Acting Director of the United States Patent and Trademark Office*